(12) United States Patent
Dainese et al.

(10) Patent No.: US 9,027,170 B2
(45) Date of Patent: *May 12, 2015

(54) PERSONAL PROTECTION DEVICE AND GARMENT INCORPORATING SAID DEVICE

(75) Inventors: Lino Dainese, Molvena (IT); Luigi Ronco, Molvena (IT)

(73) Assignee: Dainese S.p.A., Molvena (IT)

( * ) Notice: Subject to any disclaimer, the term of this patent is extended or adjusted under 35 U.S.C. 154(b) by 855 days.

This patent is subject to a terminal disclaimer.

(21) Appl. No.: 13/133,473

(22) PCT Filed: Dec. 4, 2009

(86) PCT No.: PCT/IB2009/055512
§ 371 (c)(1),
(2), (4) Date: Sep. 22, 2011

(87) PCT Pub. No.: WO2010/067288
PCT Pub. Date: Jun. 17, 2010

(65) Prior Publication Data
US 2012/0011642 A1     Jan. 19, 2012

(30) Foreign Application Priority Data

Dec. 9, 2008  (IT) .............................. RM2008A0656
May 29, 2009  (IT) .............................. VR2009A0078

(51) Int. Cl.
*A41D 13/018*    (2006.01)
*B60R 21/2338*   (2011.01)
*B62J 27/00*     (2006.01)

(52) U.S. Cl.
CPC ......... *A41D 13/018* (2013.01); *Y10T 29/49826* (2015.01); *B60R 21/2338* (2013.01); *B60R 2021/23382* (2013.01); *B62J 27/00* (2013.01); *Y10S 2/03* (2013.01)

(58) Field of Classification Search
CPC ... A41D 7/001; A41D 7/003; A41D 13/0125; A41D 13/018; A63B 31/00; B60R 21/16; B60R 21/20; B60R 21/2176; B60R 21/18; B60R 21/2338; B62J 27/00
USPC ......... 2/67, 238, 2.11, 252, 455, 468, DIG. 3; 280/743.2, 743.1, 730.2, 730.1, 728.1
See application file for complete search history.

(56) References Cited

U.S. PATENT DOCUMENTS 1,172,197 A    2/1916   Cook
2,657,716 A    11/1953  Ford
(Continued)

FOREIGN PATENT DOCUMENTS

CH    697172    6/2008
DE    2258852   6/1974
(Continued)

OTHER PUBLICATIONS

Notice of Opposition issued for EP Application No. EP09775309.9 filed on Dec. 4, 2009 in the name of Dainese S.p.A.
(Continued)

*Primary Examiner* — Alissa L Hoey
(74) *Attorney, Agent, or Firm* — Steinfl & Bruno LLP

(57) ABSTRACT

A personal protection device for protecting a user is described. The personal protection device can have an inflatable member having an internal chamber that can be inflated or deflated according to predetermined conditions.

13 Claims, 12 Drawing Sheets

(56) References Cited

U.S. PATENT DOCUMENTS

| | | | |
|---|---|---|---|
| 3,422,458 A | 1/1969 | Shueller | |
| 3,930,667 A | 1/1976 | Osuchowski et al. | |
| 4,089,065 A | 5/1978 | McGee | |
| 4,300,894 A | 11/1981 | Cumming et al. | |
| 4,397,046 A * | 8/1983 | Steiner | 2/44 |
| 4,409,271 A | 10/1983 | Pehr | |
| 4,507,801 A | 4/1985 | Kavanagh et al. | |
| 4,737,994 A | 4/1988 | Galton | |
| 4,887,842 A | 12/1989 | Sato | |
| 4,977,623 A | 12/1990 | DeMarco | |
| 5,078,423 A | 1/1992 | Fujita | |
| 5,083,361 A | 1/1992 | Rudy | |
| 5,178,938 A | 1/1993 | Magistro et al. | |
| 5,500,952 A | 3/1996 | Keyes | |
| 5,552,205 A | 9/1996 | Lea | |
| 5,781,936 A | 7/1998 | Alaloof | |
| 5,937,443 A * | 8/1999 | Kageyama et al. | 2/69 |
| 5,937,447 A | 8/1999 | Howell | |
| 5,941,866 A | 8/1999 | Niedospial, Jr. | |
| 5,945,359 A | 8/1999 | Graham | |
| 6,032,299 A | 3/2000 | Welsh | |
| 6,112,327 A * | 9/2000 | Shaffer | 2/67 |
| 6,152,481 A | 11/2000 | Arnold et al. | |
| 6,194,229 B1 | 2/2001 | Basceri | |
| 6,220,629 B1 | 4/2001 | Wipasuramonton et al. | |
| 6,230,333 B1 * | 5/2001 | Umeda | 2/463 |
| 6,239,046 B1 | 5/2001 | Viega et al. | |
| 6,301,714 B1 | 10/2001 | Son | |
| 6,350,709 B1 | 2/2002 | Veiga | |
| 6,422,597 B1 | 7/2002 | Pinsenschaum | |
| 6,435,553 B1 | 8/2002 | Wipasuramonton et al. | |
| 6,458,724 B1 | 10/2002 | Veiga et al. | |
| 6,550,809 B1 | 4/2003 | Masuda et al. | |
| 6,585,293 B2 | 7/2003 | Keshavaraj | |
| 6,641,686 B1 | 11/2003 | Veiga et al. | |
| 6,645,565 B2 | 11/2003 | Veiga | |
| 6,695,342 B2 | 2/2004 | Tanase et al. | |
| 6,701,971 B1 | 3/2004 | Sollars et al. | |
| 6,712,920 B2 | 3/2004 | Masuda et al. | |
| 6,734,125 B2 | 5/2004 | Veiga | |
| 6,740,607 B2 | 5/2004 | Veiga et al. | |
| 6,740,816 B2 | 5/2004 | Treutlein et al. | |
| 6,753,275 B2 | 6/2004 | Veiga | |
| 6,770,578 B2 | 8/2004 | Veiga | |
| 6,857,136 B1 * | 2/2005 | Bradley et al. | 2/468 |
| 6,908,528 B2 | 6/2005 | Hayes | |
| 6,971,674 B2 | 12/2005 | Johansson | |
| 6,997,218 B1 * | 2/2006 | Garcia et al. | 141/98 |
| 7,007,307 B2 * | 3/2006 | Takeuchi | 2/102 |
| 7,254,853 B1 | 8/2007 | Kim | |
| 7,305,715 B2 * | 12/2007 | Orsos | 2/67 |
| 7,549,672 B2 | 6/2009 | Sato et al. | |
| 7,651,118 B1 | 1/2010 | Veiga | |
| 7,713,890 B2 | 5/2010 | Vogt et al. | |
| 7,774,867 B2 * | 8/2010 | Orita et al. | 2/456 |
| 7,841,344 B2 * | 11/2010 | Schlosser | 128/205.22 |
| 7,951,437 B2 | 5/2011 | Keshavarag et al. | |
| 7,971,899 B2 | 7/2011 | Abney et al. | |
| 8,142,869 B2 | 3/2012 | Kobayashi et al. | |
| 8,404,780 B2 | 3/2013 | Weaver et al. | |
| 8,408,595 B2 | 4/2013 | Schindzielorz et al. | |
| 8,485,550 B2 | 7/2013 | Kino et al. | |
| 8,608,191 B2 | 12/2013 | Dainese et al. | |
| 8,653,191 B2 | 2/2014 | Ansems et al. | |
| 8,910,319 B2 | 12/2014 | Dainese et al. | |
| 2002/0022420 A1 | 2/2002 | Veiga et al. | |
| 2002/0029546 A1 | 3/2002 | Gould | |
| 2002/0078484 A1 | 6/2002 | Ulert | |
| 2002/0098755 A1 | 7/2002 | Veiga | |
| 2002/0140218 A1 | 10/2002 | Beasley | |
| 2002/0145276 A1 | 10/2002 | Veiga | |
| 2002/0175510 A1 | 11/2002 | Veiga | |
| 2002/0187696 A1 | 12/2002 | Veiga et al. | |
| 2003/0029546 A1 | 2/2003 | Wylie et al. | |
| 2003/0146614 A1 | 8/2003 | Zarazua | |
| 2003/0150401 A1 | 8/2003 | Schmid et al. | |
| 2003/0190429 A1 | 10/2003 | Blackwood et al. | |
| 2004/0029468 A1 | 2/2004 | Kim et al. | |
| 2004/0061316 A1 | 4/2004 | Elqadah et al. | |
| 2004/0211085 A1 | 10/2004 | Passke et al. | |
| 2005/0020155 A1 * | 1/2005 | Spagnuolo | 441/92 |
| 2005/0098995 A1 | 5/2005 | Fischer | |
| 2005/0138716 A1 * | 6/2005 | Orsos | 2/67 |
| 2005/0197481 A1 | 9/2005 | Temple et al. | |
| 2005/0281494 A1 | 12/2005 | Allen et al. | |
| 2006/0175810 A1 | 8/2006 | Goto | |
| 2006/0248632 A1 | 11/2006 | Colombo | |
| 2006/0292950 A1 | 12/2006 | Hill | |
| 2007/0040368 A1 | 2/2007 | Manley | |
| 2007/0128963 A1 | 6/2007 | Vogt et al. | |
| 2008/0000029 A1 | 1/2008 | Feingold et al. | |
| 2008/0169631 A1 | 7/2008 | Hill | |
| 2010/0044914 A1 | 2/2010 | Ton-That et al. | |
| 2010/0129575 A1 | 5/2010 | Veiga | |
| 2010/0181744 A1 | 7/2010 | Crouch | |
| 2010/0320736 A1 | 12/2010 | Traber et al. | |
| 2011/0110613 A1 | 5/2011 | Futase | |
| 2011/0203732 A1 | 8/2011 | Keshavaraj et al. | |
| 2012/0007344 A1 | 1/2012 | Dainese | |
| 2012/0011642 A1 | 1/2012 | Dainese | |
| 2012/0032422 A1 | 2/2012 | Dainese et al. | |
| 2012/0041141 A1 | 2/2012 | Otomo et al. | |
| 2012/0073035 A1 * | 3/2012 | Mazzarolo et al. | 2/461 |
| 2012/0161425 A1 | 6/2012 | Kino et al. | |
| 2012/0205901 A1 | 8/2012 | Westoby | |
| 2013/0059989 A1 | 3/2013 | Ansems et al. | |
| 2013/0154247 A1 | 6/2013 | Rick | |
| 2014/0014253 A1 | 1/2014 | Traber et al. | |
| 2014/0110924 A1 * | 4/2014 | Ronco | 280/743.1 |

FOREIGN PATENT DOCUMENTS

| | | |
|---|---|---|
| DE | 2626765 | 6/1976 |
| DE | 7837841 | 2/1982 |
| DE | 8620408 | 11/1986 |
| DE | 3903216 | 8/1990 |
| DE | 4007862 | 9/1990 |
| DE | 19640658 | 4/1998 |
| DE | 19732211 | 1/1999 |
| DE | 19928784 | 12/1999 |
| DE | 20003097 | 8/2000 |
| DE | 20021066 | 5/2001 |
| DE | 10141437 | 2/2003 |
| EP | 0051254 | 10/1981 |
| EP | 0043990 | 1/1982 |
| EP | 0943499 | 9/1999 |
| EP | 0994207 | 4/2000 |
| EP | 1749705 | 2/2007 |
| EP | 1767108 | 3/2007 |
| EP | 1852151 | 11/2007 |
| FR | 2674761 | 9/1992 |
| FR | 2677856 | 12/1992 |
| FR | 2822028 | 9/2002 |
| FR | 2895645 | 7/2007 |
| GB | 2229680 | 10/1990 |
| GB | 2243119 | 10/1991 |
| GB | 2251368 | 7/1992 |
| GB | 2252083 | 7/1992 |
| GB | 2302642 | 1/1997 |
| GB | 2352162 | 1/2001 |
| GB | 2391840 | 2/2004 |
| IT | VE2008A0000095 | 12/2008 |
| IT | VR2009A000212 | 12/2009 |
| IT | VR2010A000114 | 5/2010 |
| IT | VR2010A000192 | 10/2010 |
| JP | 10-317272 | 2/1998 |
| JP | 10-129380 | 5/1998 |
| JP | 11-268605 | 5/1999 |
| JP | 2002-534805 | 10/2002 |
| JP | 2002-331894 | 11/2002 |
| JP | 2005-247189 | 9/2005 |
| JP | 2007-076497 | 3/2007 |
| WO | 0123183 | 4/2001 |
| WO | 02/18180 | 3/2002 |

(56) References Cited

FOREIGN PATENT DOCUMENTS

| WO | 03/087468 | 10/2003 |
| WO | 2005074861 | 8/2005 |
| WO | 2005094620 | 10/2005 |
| WO | 2006/000248 | 1/2006 |
| WO | 2006020593 | 2/2006 |
| WO | 2007022147 | 2/2007 |
| WO | 2007138817 | 12/2007 |
| WO | 2008044222 | 4/2008 |
| WO | 2009143000 | 11/2009 |
| WO | 2010112218 | 10/2010 |

OTHER PUBLICATIONS

Reply to the Notice of Opposition filed on Jun. 21, 2013 for EP Application No. EP09775309.9 filed on Dec. 4, 2009 in the name of Dainese S.p.A.
Notice of Opposition issued for EP Application No. EP2373189 filed Dec. 4, 2009 in the name of Dainese S.p.A.
Restriction Requirement issued for U.S. Appl. No. 13/133,437, filed Sep. 21, 2011 and mailed on Jan. 4, 2013.
Non-Final Office Action issued for U.S. Appl. No. 13/133,437, filed Sep. 21, 2011 and mailed on Mar. 5, 2013.
Restriction Requirement issued for U.S. Appl. No. 13/133,524, filed Sep. 23, 2011 and mailed on Dec. 6, 2012.
Non-Final Office Action issued for U.S. Appl. No. 13/133,524, filed Sep. 23, 2011 and mailed on Apr. 2, 2013.
Superficial Definition, Merriam-Webster's Online Dictionary, available at, http://www.merriam-webster.com/dictionary/superficial (last visited on Feb. 25, 2013).
Mesh Definition, Merriam-Webster's Online Dictionary, available at, http://www.merriam-webster.com/dictionary/mesh (last visited on Feb. 26, 2013).
Weave Definition, Merriam-Webster's Online Dictionary, available at, http://www.merriam-webster.com/dictionary/weave (last visited on Feb. 28, 2013).
Woven Definition, Merriam-Webster's Online Dictionary, available at, http://www.merriam-webster.com/dictionary/woven (last visited on Feb. 28, 2013).
Side curtain Airbag Volkswagen Touran Images. Nov. 24, 2006.
International Search Report of PCT Application PCT/JP2007/059170 (published as WO 2007138817) filed on Apr. 27, 2007 in the name of Takata Corporation.
EPO Search Report of Italian Application VE2008A0000095 filed on Dec. 31, 2008 in the name of RG Equipe DI Golin Roberto & C. S.A.S.
Written Opinion of Italian Application VE2008A0000095 filed on Dec. 31, 2008 in the name of RG Equipe DI Golin Roberto & C. S.A.S.
EPO Search Report of Italian Application VR2009A000039 filed on Mar. 25, 2009 in the name of Dainese, S.P.A.
Written Opinion of Italian Application VR2009A000039 filed on Mar. 25, 2009 in the name of Dainese, S.P.A.
EPO Search Report of Italian Application VR2009A000212 filed on Dec. 4, 2009 in the name of Dainese S.P.A.
Written Opinion of Italian Application VR2009A000212 filed on Dec. 4, 2009 in the name of Dainese S.P.A.
EPO Search Report of Italian Application VR2010A000114 filed on May 28, 2010 in the name of Dainese S.P.A.
Written Opinion of Italian Application VR2010A000114 filed on May 28, 2010 in the name of Dainese S.P.A.
EPO Search Report of Italian Application VR2010A000192 filed on Oct. 5, 2010 in the name of Dainese S.P.A.
Written Opinion of Italian Application VR2010A000192 filed on Oct. 5, 2010 in the name of Dainese S.P.A.
International Search Report of PCT Application PCT/IB2009/055507 filed on Dec. 4, 2009 in the name of Dainese S.P.A.
Written Opinion of PCT Application PCT/IB2009/055507 filed on Dec. 4, 2009 in the name of Dainese S.P.A.
International Search Report of PCT Application PCT/IB2009/055512 filed on Dec. 4, 2009 in the name of Dainese S.P.A.
Written Opinion of PCT Application PCT/IB2009/055512 filed on Dec. 4, 2009 in the name of Dainese S.P.A.
International Search Report of PCT Application PCT/IT2009/000547 filed on Dec. 4, 2009 in the name of Dainese S.P.A.
Written Opinion of PCT Application PCT/IT2009/000547 filed on Dec. 4, 2009 in the name of Dainese S.P.A.
Partial International Search Report of PCT Application PCT/IB2009/055516 filed on Dec. 4, 2009 in the name of Dainese S.P.A.
International Search Report of PCT Application PCT/IB2009/055516 filed on Dec. 4, 2009 in the name of Dainese S.P.A.
Written Opinion of PCT Application PCT/IB2009/055516 filed on Dec. 4, 2009 in the name of Dainese S.P.A.
EPO Search Report of Italian Application RM2008A000656 filed on Dec. 9, 2008 in the name of Dainese S.P.A.
Written Opinion of Italian Application RM2008A000656 filed on Dec. 9, 2008 in the name of Dainese S.P.A.
EPO Search Report of Italian Application RM2008A000657 filed on Dec. 9, 2008 in the name of Dainese S.P.A.
Written Opinion of Italian Application RM2008A000657 filed on Dec. 9, 2008 in the name of Dainese S.P.A.
EPO Search Report of Italian Application VR2009A000078 filed on May 29, 2009 in the name of Dainese S.P.A.
Written Opinion of Italian Application VR2009A000078 filed on May 29, 2009 in the name of Dainese S.P.A.
EPO Search Report of Italian Application VR2009A000059 filed on Apr. 24, 2009 in the name of Dainese S.P.A.
Written Opinion of Italian Application VR2009A000059 filed on Apr. 24, 2009 in the name of Dainese S.P.A.
Notice of Allowance mailed on Aug. 21, 2013 for U.S. Appl. No. 13/133,437, filed Sep. 21, 2011 in the name of Lino Dainese et al.
Final Office Action mailed on Aug. 19, 2013 for U.S. Appl. No. 13/133,524, filed Sep. 23, 2011 in the name of Lino Dainese et al.
Non-Final Office Action mailed on Feb. 19, 2014 for U.S. Appl. No. 13/133,524, filed Sep. 23, 2011 in the name of Lino Dainese et al.
Non-Final Office Action mailed on Dec. 6, 2013 for U.S. Appl. No. 13/133,468, filed Sep. 26, 2011 in the name of Lino Dainese et al.
International Search Report issued on Oct. 10, 2012 for PCT/2012/053302 which was filed on Jun. 28, 2012 in the name of Dainese S.P.A.
Written Opinion issued on Oct. 10, 2012 for PCT/2012/053302 which was filed on Jun. 28, 2012 in the name of Dainese S.P.A.
International Preliminary Report on Patentability issued on Jun. 10 2013 for PCT/2012/053302 which was filed on Jun. 28, 2012 in the name of Dainese S.P.A.
Final Office Action issued on Jun. 9, 2014 for U.S. Appl. No. 13/133,468 which was filed on Sep. 26, 2011 in the name of Lino Dainese et al.
Notice of Allowance issued on Sep. 5, 2014 for U.S. Appl. No. 13/133,468, filed Sep. 26, 2011 in the name of Lino Dainese et al.
Non-Final Office Action issued on May 7, 2014 for U.S. Appl. No. 14/126,786, filed Dec. 16, 2013 in the name of Dainese S.P.A.
Decision of Rejection for Japanese Patent Application No. 2011-539166 filed in the name of Dainese S.P.A. on Jun. 7, 2011. Mail date: Apr. 14, 2014 (English translation and Japanese Original).
Decision of Rejection for Japanese Patent Application No. 2011-539164 filed in the name of Dainese S.P.A. on Jun. 7, 2011. Mail date: Nov. 6, 2014 (English translation and Japanese Original).
Decision to Grant for Japanese Patent Application No. 2011-539166 filed in the name of Dainese S.P.A. on Jun. 7, 2011. Mail date: Dec. 15, 2014 (English translation and Japanese Original).
Opposition Against EP2373189 in the name of Dainese S.p.A.— Opponent Alpinestars S.p.A. dated: Sep. 3, 2014.
Notice of Reasons for Rejection for Japanese Patent Application No. 2011-539166 filed in the name of Dainese S.P.A. on Jun. 7, 2011. Mail date: Aug. 28, 2013 (English translation and Japanese Original).
Notice of Reasons for Rejection for Japanese Patent Application No. 2011-539164 filed in the name of Dainese S.P.A. on Jun. 7, 2011. Mail date: Feb. 3, 2014 (English translation and Japanese Original).

* cited by examiner

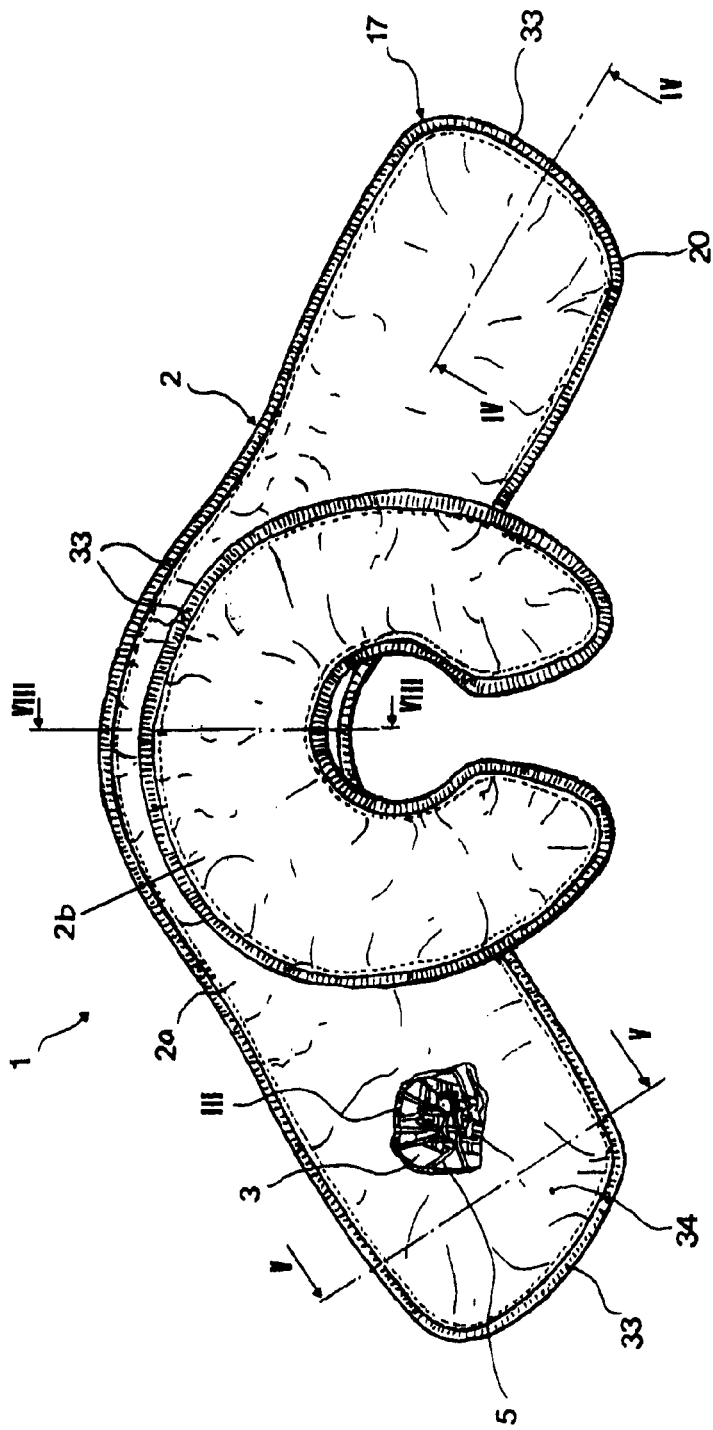
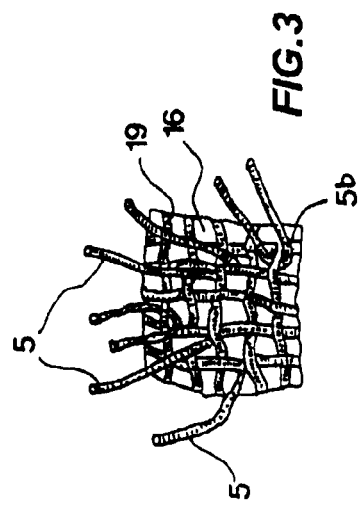
FIG.2
FIG.3

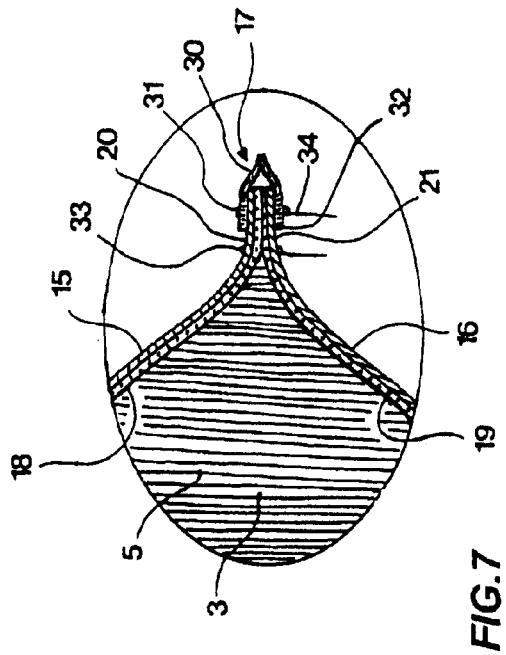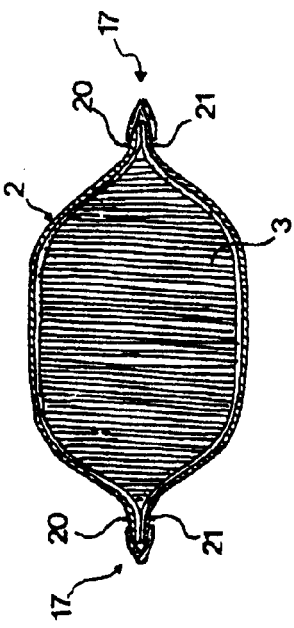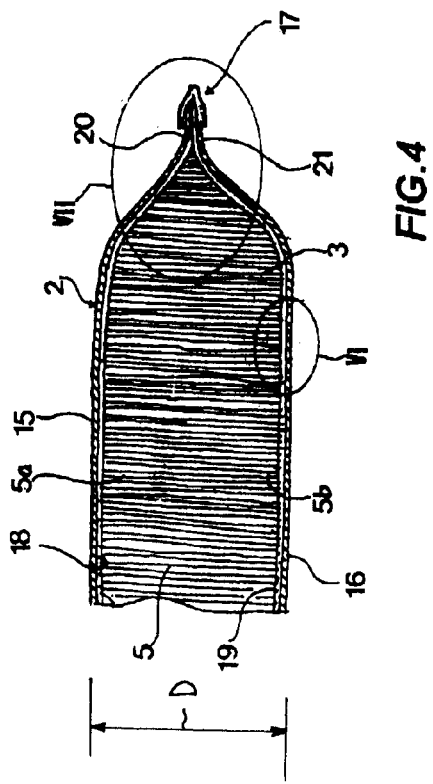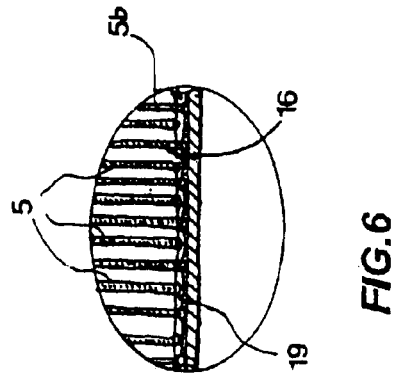

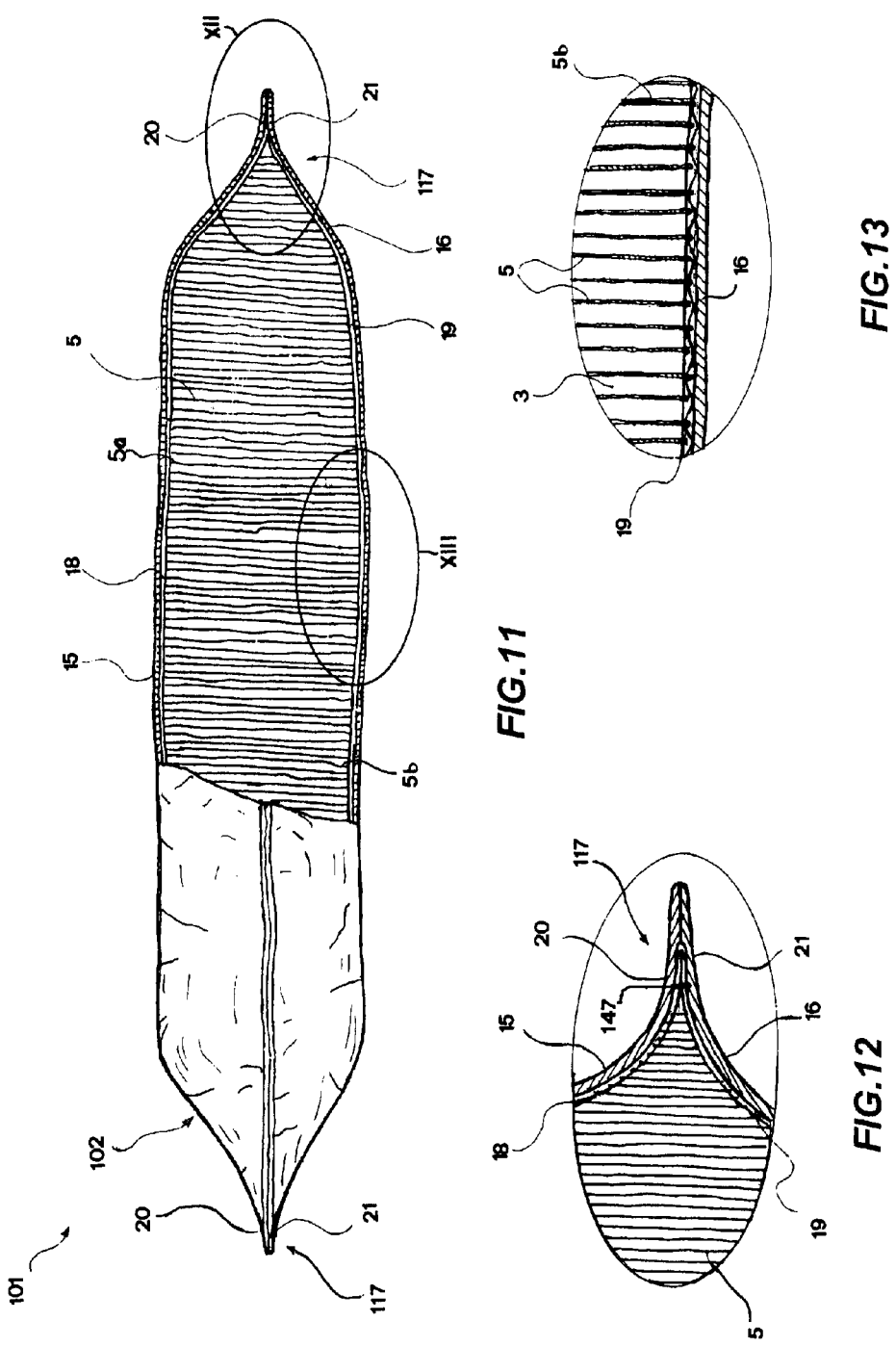

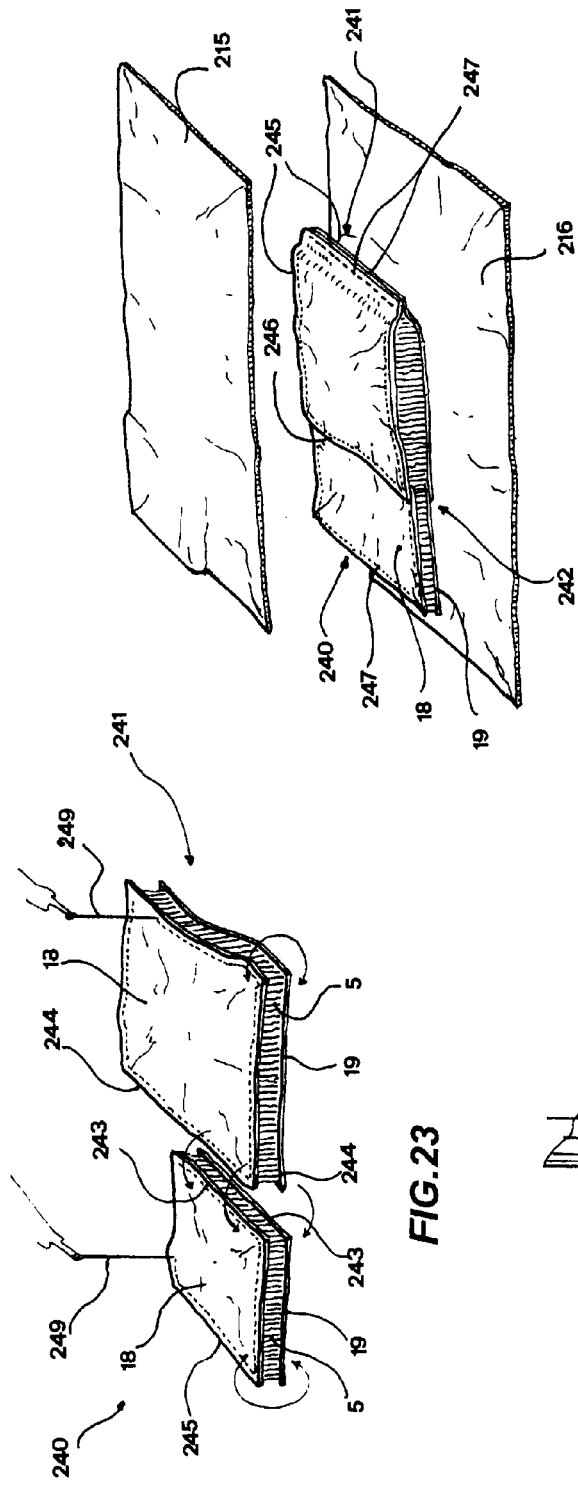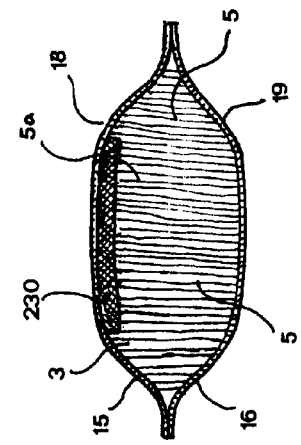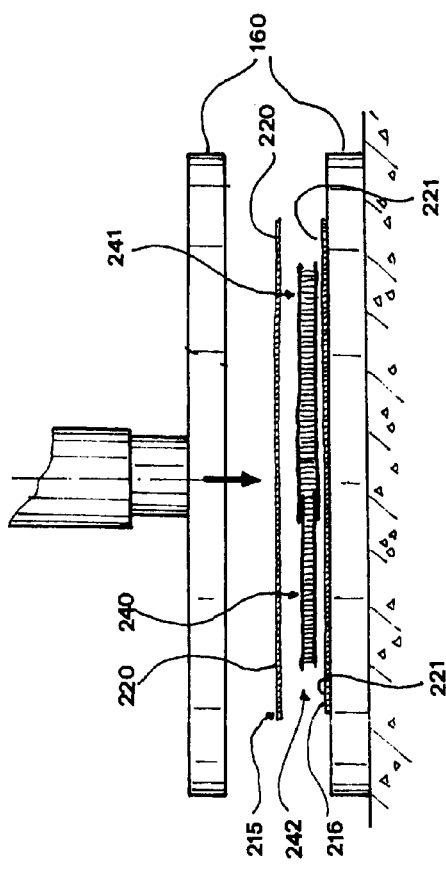
FIG. 23A
FIG. 25
FIG. 23
FIG. 24

PERSONAL PROTECTION DEVICE AND GARMENT INCORPORATING SAID DEVICE

CROSS REFERENCE TO RELATED APPLICATIONS

The present application is the US national stage of International Application PCT/IB2009/055512 filed on Dec. 4, 2009, which claims priority to Italian Patent Application RM2008A000656 filed on Dec. 9, 2008 and to Italian Patent Application VR2009A000078 filed on May 29, 2009, both of which are incorporated herein by reference in their entirety. The present application may be related to International Applications PCT/IB2009/055507, filed on Dec. 4, 2009; PCT/IT2009/000547, filed on Dec. 4, 2009; and PCT/IB2009/055516, filed on Dec. 4, 2009.

The present disclosure refers to a protection device for a personal protection, of the type including an inflatable member and adapted to protect from impacts and/or falls a passenger, a motor vehicle driver or an alike user, during a sporting and/or working activity.

In the last years, as a result of a constant research in safety during all sporting activities, but more generally all those dangerous activities practiced under extreme conditions or at high speeds, a plurality of protection devices have been contrived for a user engaged in one of said dangerous activities.

In particular, the motorcycling field is particularly attentive to such problems; in the last years, the offer of protection devices allowing effective and concomitantly practical motorcyclist protection has increased.

A practical solution is that of a personal protection device including an inflatable bag which is arranged deflated in a resting condition, and is worn-on by a user at body parts potentially concerned by impacts and entailed possible lesions.

At the instant of an impact, a slipping or a fall in general, the inflatable bag is set in fluid communication with a gas source, like a compressed gas canister or a gas generator. Generally, the gas source is adapted to introduce a preset amount of compressed gas such as to set the inflatable bag in an inflated, therefore tensioned condition, to form a sort of inflated balloon. Therefore, the amount of gas introduced is strictly correlated to the bag volume in order to guarantee a satisfactory inflation.

A need stemming from the use of said inflatable bag is that of controlling as much as possible the overall shape of the bag in an inflated condition, in order to obtain a bag that, in an inflated condition, be as much as possible shaped to a user's body part that has to be protected.

Ultimately, the need has arisen to provide a protection device for a personal protection comprising an inflatable bag, whose shape in a condition of maximum expansion may be controlled, i.e. a bag that, once inflated, has a previously determined shape.

To meet this need, a way to proceed is that of providing a plurality of fixed connection points between opposite superficial portions of a non-tubular inflatable member, i.e. forming inside the member a plurality of septums or diaphragms obtained by mutual fixing between opposite face portions of the same inflatable member.

This way to proceed, though advantageous from several standpoints, entails some drawbacks that have not yet been overcome.

A drawback lies in the fact that said diaphragms or septums, being formed by inflatable member portions fixed therebetween, have a reduced resistance to overpressures to which the inflatable member is subjected at inflation, under the action of pressurized gas introduced whose direction of diffusion/distribution is hardly predictable, above all at member inflation. In fact, taking into account the flabby consistency of the inflatable bag and the folded arrangement in the deflated condition, it can be understood that it is actually difficult to foresee how pressurized gas distribution will occur therein.

That is, in some bag portions, above all those nearer to the inlet point of the inflating gas, during inflation localized overpressures occur which can exceed the maximum admissible values beyond which bag damaging can take place.

Such overpressures, or even local impacts, can determine a rupture of the septums or diaphragms and therefore can cause an expansion of the inflatable member, or sometimes a rupture thereof, such as to determine an undesired excessive expansion of the inflatable member, thereby prejudicing the possibility of having a member of desired shape.

Moreover, as anticipated, with the diaphragm rupturing and a greater expansion of the inflatable member occurring, with an increase in the internal volume thereof, there is the risk that an amount of gas introduced, predetermined on the basis of the shape of the member having intact diaphragms by providing a canister of corresponding capacity, be not sufficient to tension the member homogeneously and with the right internal pressure, causing the protection device to be ineffective at the time of an impact.

A technical problem at the basis of the present disclosure lies in providing a protection device for the personal protection capable of overcoming the abovementioned drawbacks and/or of achieving further advantages, and of providing a garment including said device for the personal protection.

Such a problem is solved by a protection device for the personal protection of a user according to claim 1 and by a method for manufacturing a protection device according to claim 24.

Secondary features of the subject of the present disclosure are defined in the corresponding dependent claims thereof.

By the term "mesh" it is meant, within the scope of the present disclosure, a porous patch or cloth having the likeness of a mesh.

By the term "wall" or "sheet" it is meant, within the scope of the present disclosure, a covering member for a respective mesh, wherein the first and the second wall are associated therebetween so as to define a chamber inside which the first and the second mesh, and the tie members connecting the first and the second mesh are arranged.

The subject of the present disclosure provides several relevant advantages.

A first advantage consists in the fact that the use of a plurality of tie members fixed to respective meshes allows to control the shape of the inflatable member in an inflated condition, and concomitantly ensure a satisfactory protection to the user.

In particular, the inflatable member has a shape determinable from the maximum distance obtainable between the meshes with a maximum longitudinal extension of the tie members, thanks to the fact that it is substantially a bivalve-type inflatable member and comprises at least a first sheet or first wall, or first valve, to which a first mesh is adherently fixed, and a second sheet, or second wall, or second valve, to which a second mesh is adherently fixed, in which said meshes are connected therebetween by a plurality of tie members, and wherein said two sheets are opposed therebetween and perimetrically sealingly connected along respective perimetral edges.

Essentially, the inflatable member in an inflated condition may have any one shape and size, it being sufficient to arrange, in a case formed between two opposite walls or sheets, a structure including a first mesh and a second mesh and the tie members fixed to the meshes, preferably by connecting opposite portions of the inflatable member, wherein each mesh is associated adherent to the respective wall, and adjusting the length of the tie members, so that the tie members have a condition of maximum tension and/or maximum extension when the inflatable member is inflated. In practice, the shape and size of the inflatable member can be controlled and set a priori, since the maximum expansion of the inflatable member can be controlled by controlling the length and the maximum tension of the tie members.

Therefore, by suitably arranging the tie members inside the internal chamber and optionally providing different lengths for the tie members depending on their location in the same chamber, it is possible to determine the shape assumed by the inflatable member in an inflated condition.

Moreover, thanks to this shape control, the inflatable member can easily be coupled to other protection devices or members independent of the inflatable member, and having a shape conjugated to that of the inflatable member in an inflated condition.

For instance, by utilizing tie members having the same length it is possible to manufacture an inflatable member having a flattened, plate-shaped, mat-like shape, which can be easily coupled to a flat member, like, e.g., a rigid plate, for an additional protection of a user.

A further advantage lies in the fact that the tie members guarantee a limited expansion of the inflatable member in an inflated condition so as to obtain a reduced encumbrance, and in particular a limited thickness, concomitantly ensuring an adequate protection for a user.

Such a reduced encumbrance allows, in case of fortuitous inflation of the inflatable member, a lesser discomfort and risk to a user while he/she drives a vehicle. In other words, a limited expansion of the inflatable member does not prejudice the control of a vehicle by the user, and therefore does not constitute a risk of accident. An adequate protection is also due to the fact that, the plurality of tie members being distributed in the chamber, the personal protection device has a greater resistance to localized impacts, or overpressures. In fact, should one of the tie members break, such a breaking of a single tie member would not prejudice the desired limitation of the expansion of the inflatable member, such a limitation being anyhow ensured by the other tie members.

Another advantage lies in the fact that by controlling the shape of the inflatable member it is possible to control (and in particular to limit) also an amount of gas needed for satisfactory inflation of the inflatable member.

Moreover, the presence of a plurality of ties between the first mesh and the second mesh allows to obtain a protection device having a structure provided with a certain sturdiness in an inflated condition. In fact, by suitably calibrating the length of the tie members with the overall dimensions of the inflatable member, it is possible to obtain a member that in an inflated condition has a certain sturdiness and constructive solidity; this contributes to a greater protection for a user. Such a sturdiness allows to the device according to the present disclosure to be used as a so-called "individual protection device" for the protection of an individual from unforeseen impacts or falls, i.e., to protect an individual in case of an unforeseen offensive event. To this end, the protection device according to the present disclosure can be inflated over very rapid times, of the order of milliseconds (ms), and even more particularly between 10 to 500 ms, preferably between 10 and 200 ms, even more preferably to reach overpressures (with respect to the atmospheric pressure) comprised between 0.5 and 3 bar.

In this connection, in an embodiment, the personal protection device includes means for actuating and means for inflating the inflatable member, i.e., one or more sensors capable of detecting the unforeseen event, and valves capable of connecting the internal chamber of the inflatable member with a source of inflating fluid.

The source of inflating fluid preferably comprises a generator of cold gas, like e.g. Helium, i.e. a container in which gas is held at a high pressure. An advantage of utilizing a cold gas generator lies in the fact that gas cools down as it diffuses in the inflatable member, and cools down any residual gases present inside the inflatable member, fostering the keeping of the inflatable member in an inflated condition.

A further advantage lies in the fact that the tie members, by being stably connected to the respective meshes, offer a high strength even in case of local pressures due to knocks at the instant of an impact or of a fall.

In a preferred embodiment, the tie members are of flexible type, and therefore can be flexed or tensioned when required, depending on member inflation. Preferably, the tie members are suitably sized so that when the inflatable member is in a resting deflated condition they are in a non-tensioned condition, preferably collapsed in said internal chamber, whereas when the inflatable member is in an inflated condition they are subjected to stress, and in particular to tensile stress. This embodiment guarantees a minimum encumbrance of the inflatable member in a deflated condition.

In an embodiment the tie members have the shape of threads, to form with the two meshes a so-called 3D (three-dimensional) or double-knit fabric. Each thread, having the function of tie member, comes out from one of said first and second mesh and is integrally and continuously interlaced with the other one of said first and second mesh. Substantially, it is a continuous interlacing between the thread forming the meshes and the threads/ties connecting the two meshes. This embodiment allows to distribute a high number of tie members with a relatively high surface density, such as to guarantee a satisfactory control of the shape and, if necessary, a sufficient limitation of the expansion of the inflatable member.

In an embodiment, each wall is glued to the respective mesh, and has a surface extension greater than the mesh associated thereto and has peripheral edges, projecting with respect to the meshes, which are sealingly joined. This embodiment entails the advantage of simplifying the steps of manufacturing the inflatable member.

In an embodiment, the first mesh is perimetrically fixed, e.g. by seaming, in direct contact with the second mesh. This embodiment entails the advantage of allowing an improved strength of the inflatable member at the inflation stage, reducing wall tearing risk, and of satisfactorily enduring pressure waves occurring inside the inflatable member at the perimetral zones during the inflation stage.

In an embodiment, the tie members are elastic. Elasticity entails the advantage of enabling a controlling of tie member tensioning (by elastic deformation control), and therefore a further controlling of the shape of the inflatable member, at the time of inflation of the inflatable member, as well as of facilitating a subsequent deflation of the inflatable member (by return to an undeformed condition).

In an embodiment, the inflatable member comprises a reinforcing layer associated to a respective superficial portion; in a preferred embodiment, the reinforcing layer is interposed between a mesh and the respective wall lined thereby. When the protection device is worn-on by the user, said reinforcing layer faces the outside environment; in other words, the internal chamber of the inflatable member is interposed between the reinforcing layer and the user's body.

The reinforcing layer is flexible and therefore not inconvenient to the user. However, when the inflatable member is in an inflated condition, it is placed under tensile stress by the inflatable member itself and therefore assumes a more rigid behaviour. In particular, the presence of the reinforcing layer is advantageous as it allows to increase penetration strength: a concentrated force (e.g., due to an impact against a sharp object) acting on the reinforcing layer is redistributed by the latter on a wider surface of inflatable member.

Thus, local deformation of the inflatable member due to a concentrated force is reduced, as it is reduced the possibility that said sharp object may deform to such a point the inflatable member, until impacting on the user's body. Moreover, the presence of the reinforcing layer ensures to the inflatable member a good protection effectiveness even when the latter is not completely inflated.

In an embodiment, the protection device further comprises a deflation valve, communicating on one side with the internal chamber and on the other side with an external environment, for allowing a deflation of the inflatable member from the inflated condition to the deflated condition. This deflation valve may be controlled directly manually by the user, or by an electronic control system. This enables the user, following a fall that has entailed the actuation/inflation of the protection device, to return the device itself to a non-operative/deflated condition, so as to easily continue the sporting activity, like e.g. a motorcycling competition.

In an embodiment, the protection device is of a type directly wearable on a user's body.

In an embodiment, the protection device is included in a garment, such as, e.g. a motorcyclist suit, and is easily wearable by a user.

Preferably, to reduce the encumbrance as much as possible, the garment comprises a pocket intended to house the protection device.

Other advantages, features and operation steps of the subject of the present disclosure will be made evident in the following detailed description of some preferred embodiments thereof, given by way of example and not for limitative purposes. However, it is evident how each embodiment could have one or more of the advantages listed above; anyhow, it is not required for each embodiment to concurrently have all of the advantages listed.

Reference will be made to the figures of the annexed drawings, wherein:

FIG. 2 shows a top plan view of the partially sectioned protection device of FIG. 1;

FIG. 3 shows a view of a detail III of FIG. 2;

FIG. 4 shows a sectional view along line IV-IV of FIG. 2;

FIG. 5 shows a sectional view along line V-V of FIG. 2;

FIG. 6 shows a detail VI of FIG. 4 on an enlarged scale;

FIG. 7 shows a detail VII of FIG. 4 on an enlarged scale;

FIG. 11 shows a sectional view of a protection device according to the present disclosure in accordance with a further embodiment;

FIG. 12 shows a detail XII of FIG. 11 on an enlarged scale;

FIG. 13 shows a detail XIII of FIG. 11 on an enlarged scale;

Figure 1:
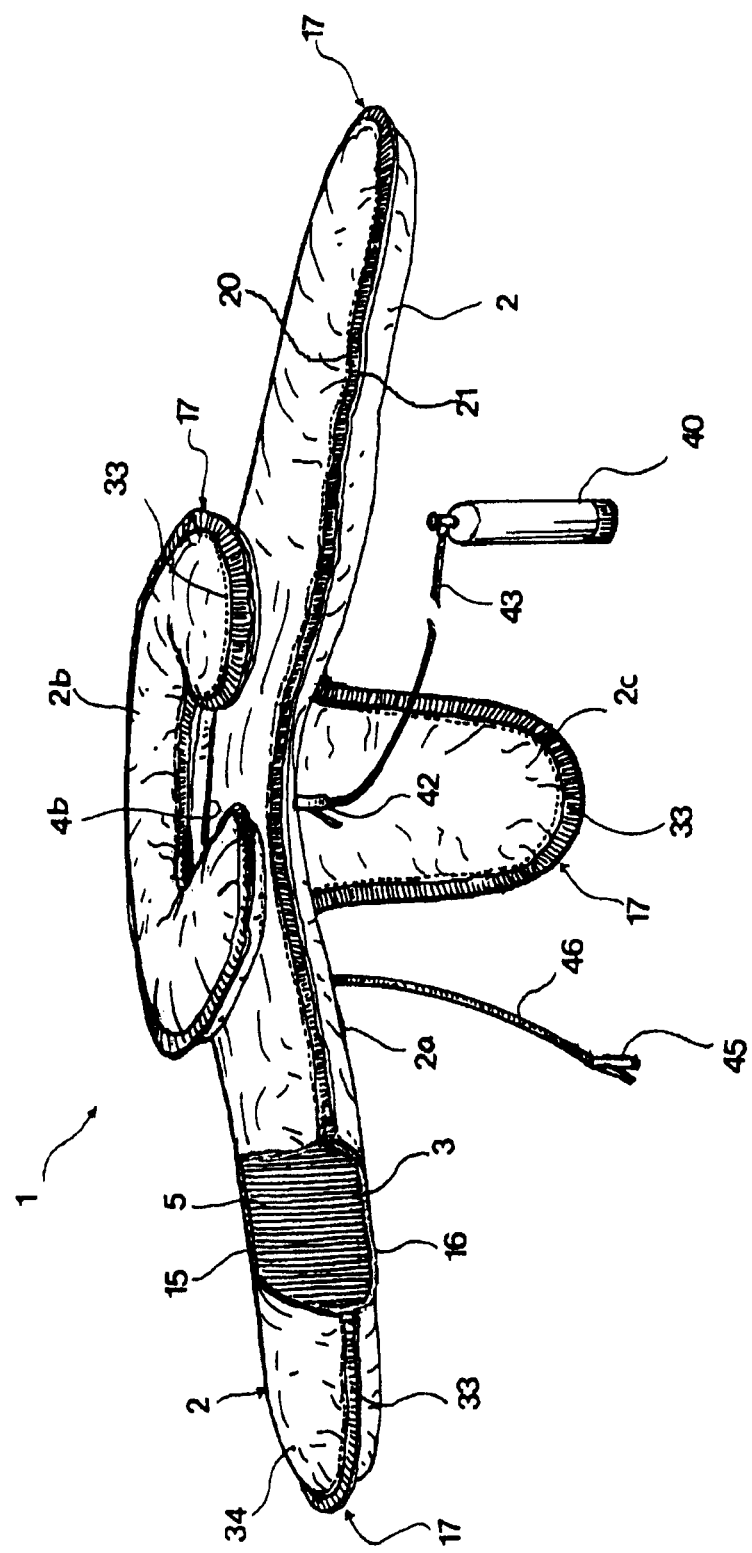
FIG. 1 shows a partially sectional perspective view of a protection device according to the present disclosure in an inflated condition.
Figure 9:
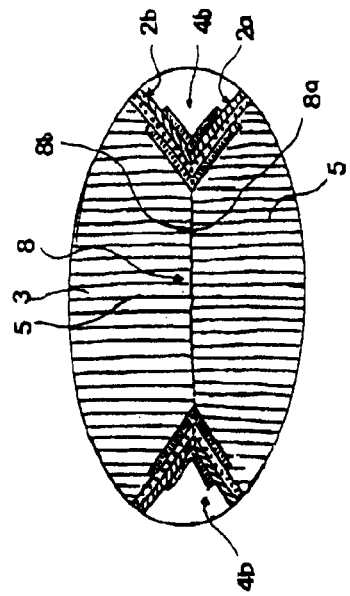
FIG. 9 shows a view of a detail IX of FIG. 8 on an enlarged scale.
Figure 10:
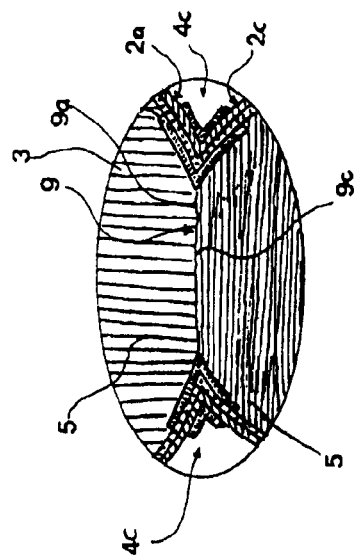
FIG. 10 shows a view of a detail X of FIG. 8 on an enlarged scale.
Figure 8:
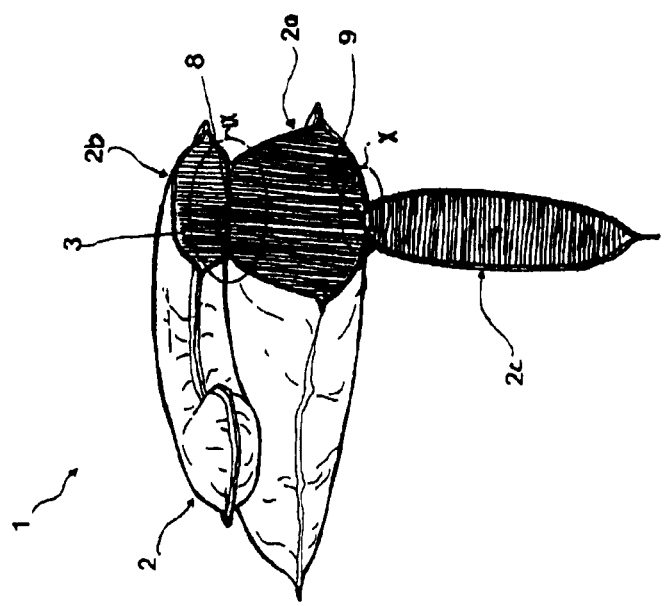
FIG. 8 shows a sectional view along line VIII-VIII of FIG. 2.
Figure 14:
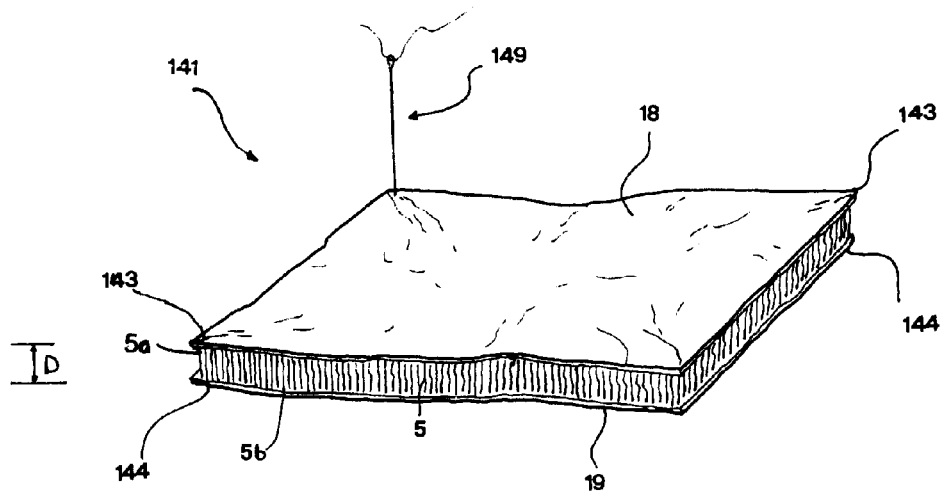
Figure 15:
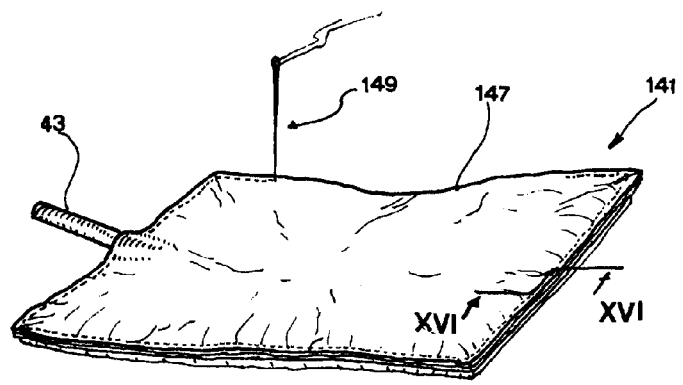
Figure 16:
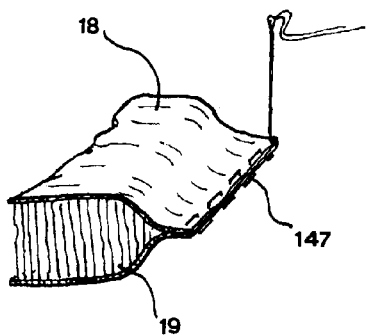
Figure 17:
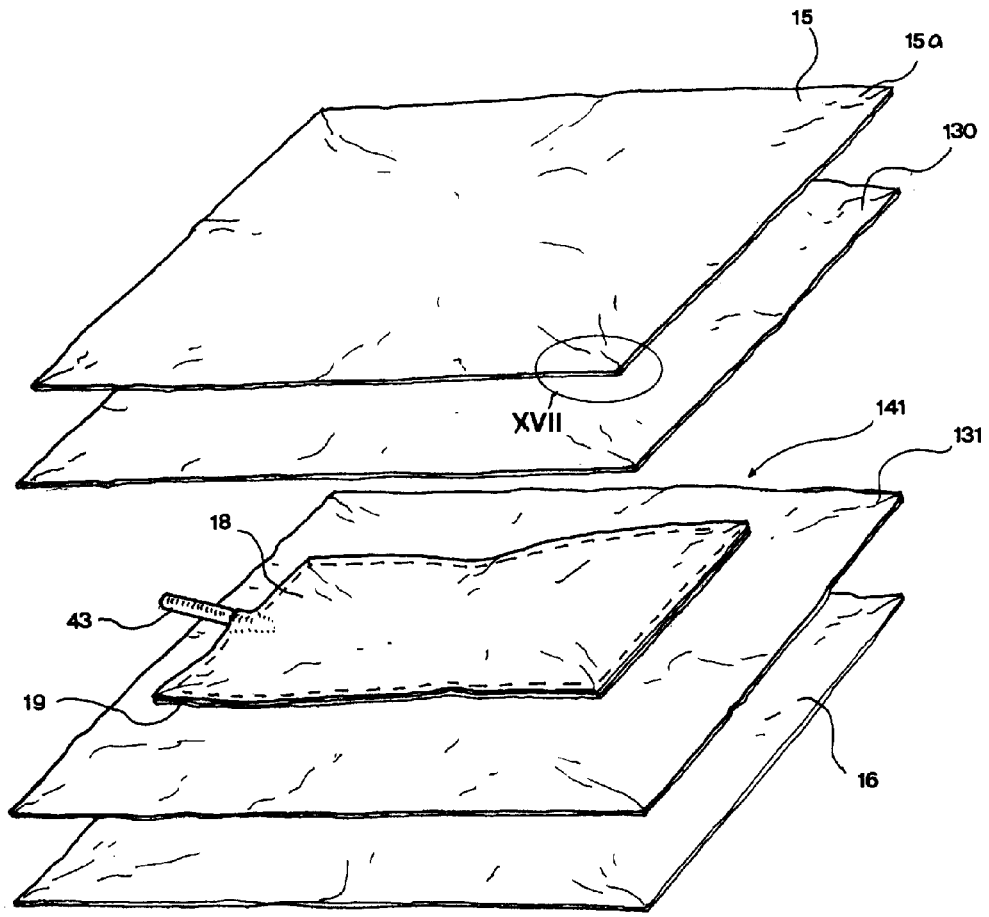
Figure 17A:
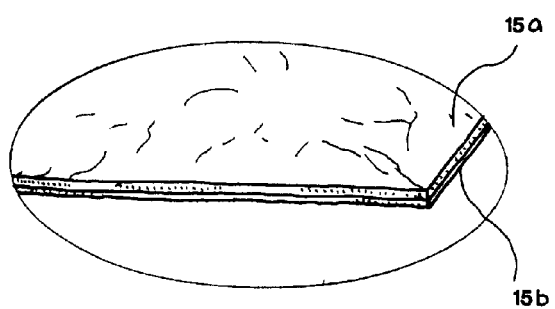
Figure 18:
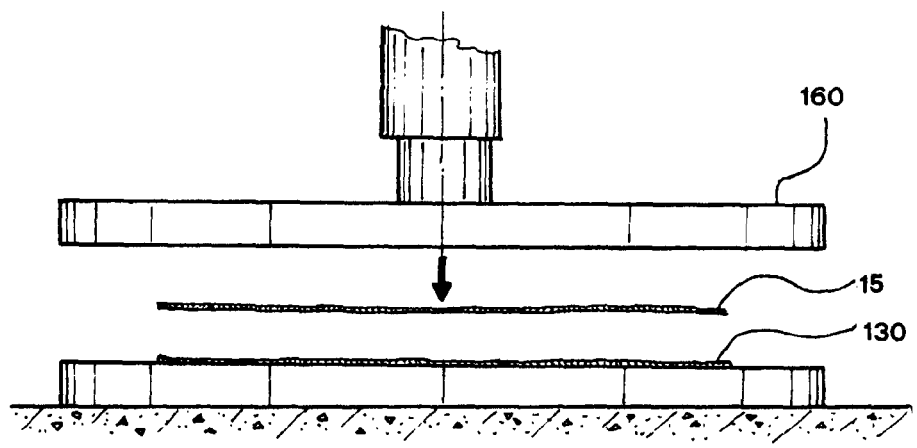
Figure 19:
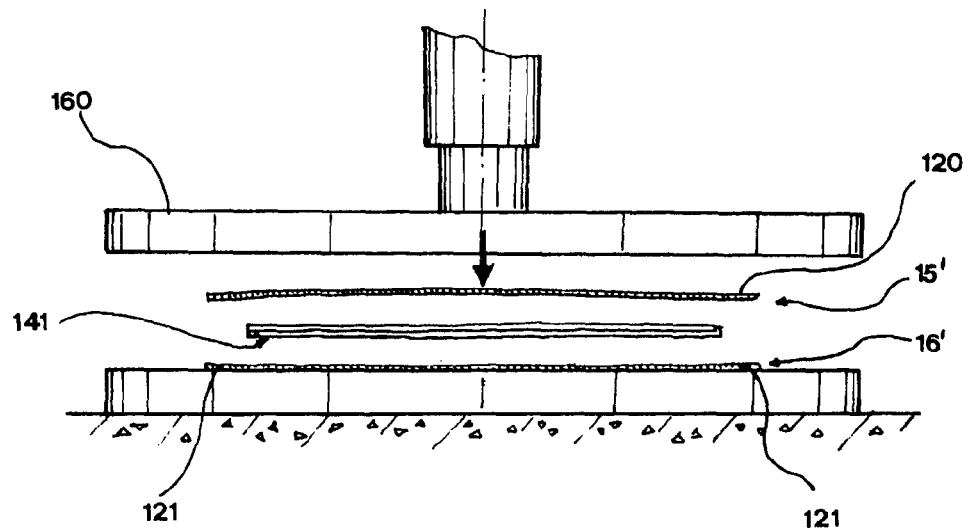
Figure 20:
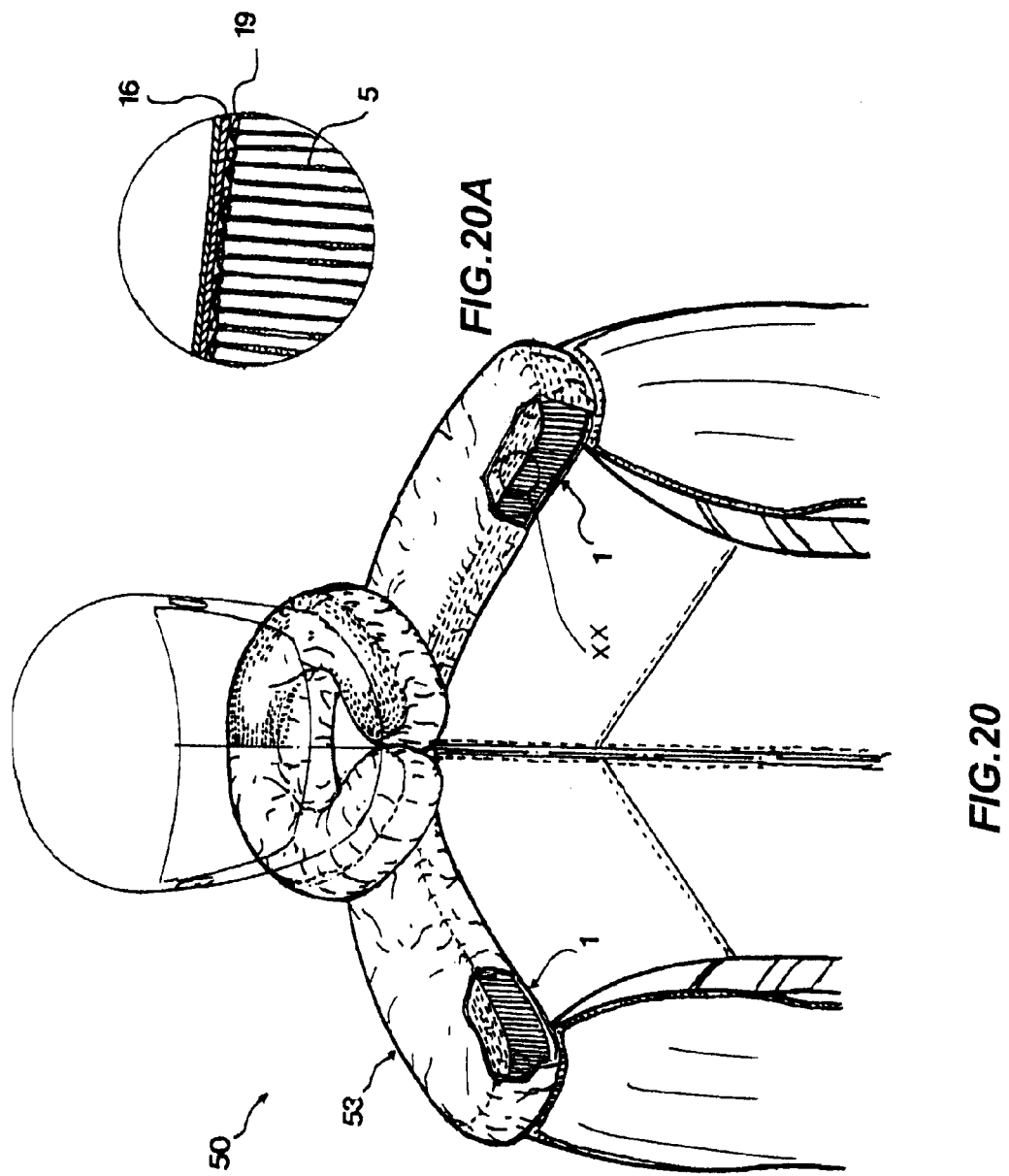
Figure 21:
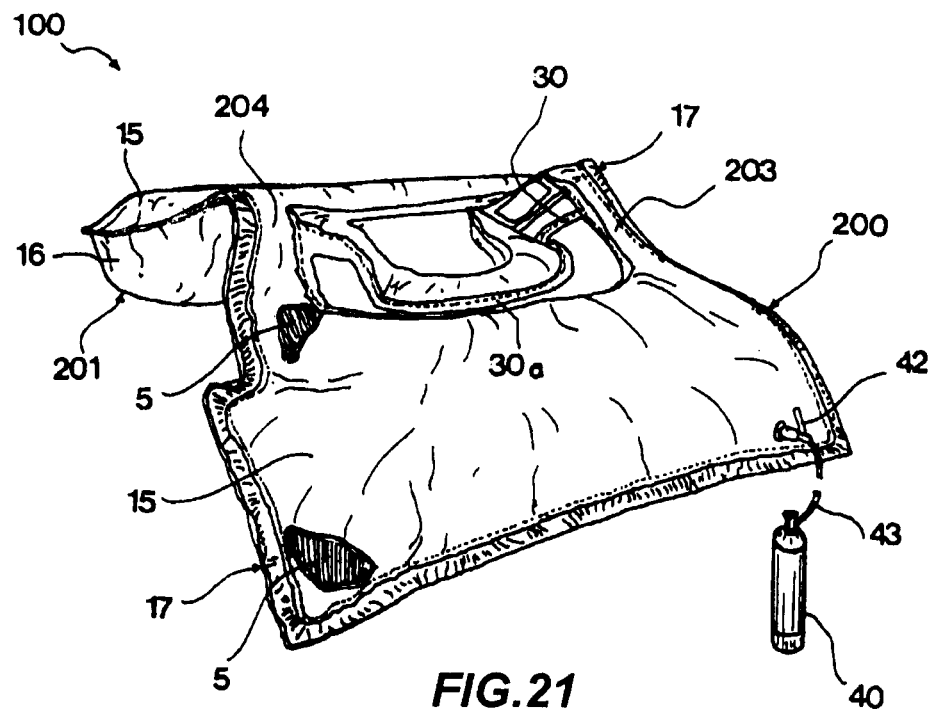
Figure 22:
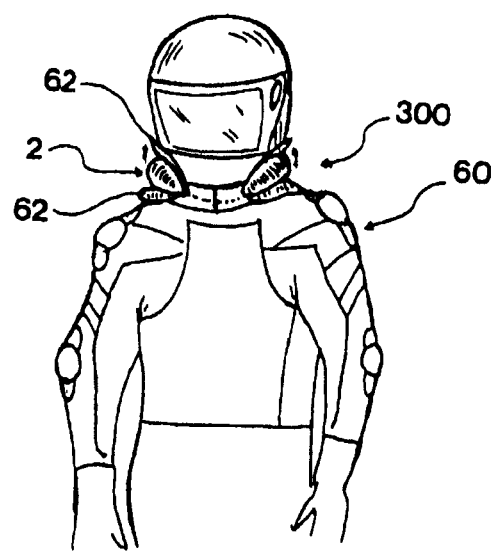
Figure 26:
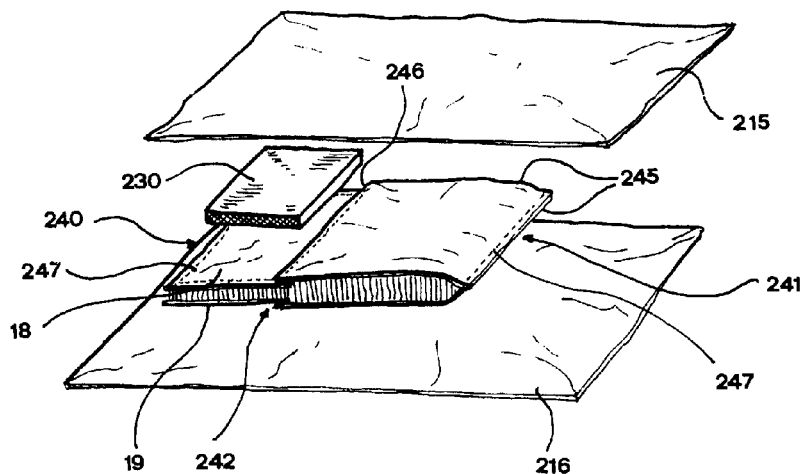
Figure 27:
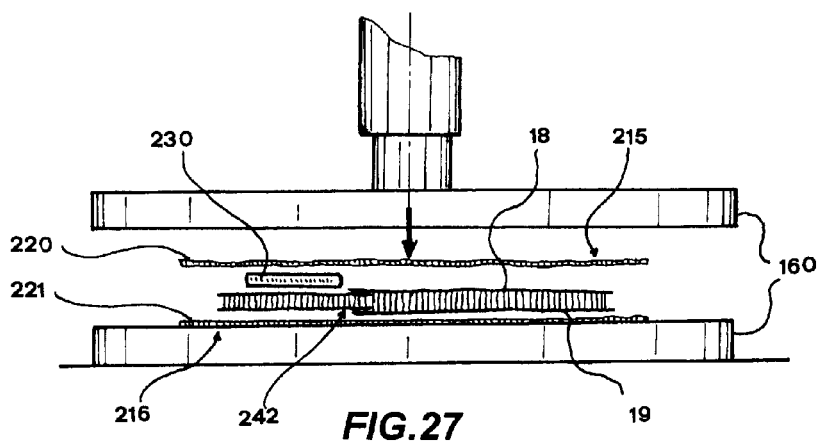
Figure 28:
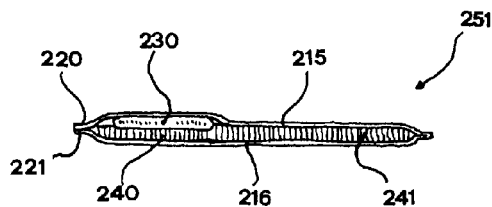
Figure 29:
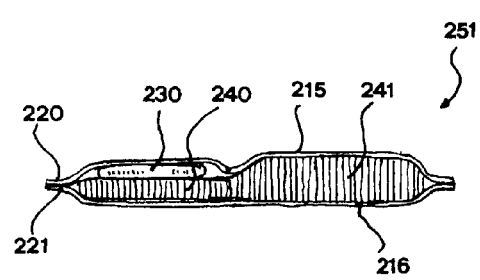

FIG. 14 schematically shows a first step of a method for manufacturing a protection device according to the present disclosure;

FIG. 15 shows, schematically and in a perspective view, a second step of a method for manufacturing a protection device according to the present disclosure;

FIG. 16 shows on an enlarged scale a detail in a section along line XVI-XVI of FIG. 15;

FIG. 17 shows a protection device according to the present disclosure, with detached parts;

FIG. 17A shows a detail XVII of FIG. 17;

FIG. 18 shows, schematically and in a perspective view, a third step of a method for manufacturing the protection device according to the present disclosure;

FIG. 19 shows, schematically and in a perspective view, a fourth step of a method for manufacturing the protection device according to the present disclosure;

FIG. 20 shows a garment including a protection device according to the present disclosure in an inflated condition and partially sectioned;

FIG. 20A shows a detail XX of FIG. 20;

FIG. 21 shows a perspective view of another protection device according to the present disclosure, partially sectioned;

FIG. 22 shows a further garment including a protection device according to the present disclosure;

FIG. 23 shows, schematically and in a partially sectional perspective view, a first step of a method for manufacturing a protection device according to the present disclosure, in accordance with a further embodiment;

FIG. 23A shows, schematically and in a partially sectional perspective view, a second step of the method of FIG. 23;

FIG. 24 shows, schematically and in a perspective view, another step of the process of FIG. 23;

FIG. 25 shows a sectional view of a protection device according to the present disclosure in accordance with a further embodiment;

FIG. 26 shows, schematically and in a partially sectional perspective view, a step of a method for the manufacturing of a protection device according to the present disclosure, in accordance with a further embodiment;

FIG. 27 shows, schematically and in a partially sectional perspective view, another step of the method of FIG. 27;

FIG. 28 shows, in a sectional side view, a protection device obtained by the method of FIGS. 26 and 27 in a deflated condition;

FIG. 29 shows the device of FIG. 28 in an inflated condition.

Referring to the annexed figures, by reference number 1 a personal protection device according to the present disclosure is denoted, in accordance with a first embodiment.

In particular, the protection device 1 comprises an inflatable member 2 in which an internal chamber 3 is defined, said inflatable member 2 being adapted to assume substantially a first resting condition, or deflated condition, and a second active condition, or inflated condition. The inflation modes of the inflatable member 2 will be described hereinafter in the description.

The protection device 1 comprises a plurality of tie members 5 distributed in the internal chamber 3 and stably connected to respective portions of the inflatable member 2, in particular to superficial portions thereof.

By the term tie member 5 it is meant a member or entity having the function of keeping joined or constrained or stationary or stationary, it being tensioned by tensile stress, two or more portions of the inflatable member 2, at least when the latter is in an inflated condition.

In the example the tie members 5 are of thread-shaped type, and are flexible and inextensible members. Therefore, they are suitably sized so that, when the inflatable member 2 is in a resting condition, they are preferably not subjected to tensioning and are collapsed in the internal chamber 3, whereas when the inflatable member 2 is in an inflated condition they are subjected to tensile stress, as illustrated by way of example in FIGS. 4 and 5.

In a further embodiment of the subject of the present disclosure, the tie members 5 besides being of thread-shaped and flexible type, are elastic members. Therefore, they are suitably sized so that, when the inflatable member 2 is in a resting condition, they are preferably not subjected to tensioning, or possibly subjected to a slight tensioning, whereas when the inflatable member 2 is in an inflated condition they are tensioned until reaching a greater extension and a greater tensioning. According to an aspect of the present disclosure, it is advantageous that the tie members 5 be thickly distributed in the inflatable member 2, e.g. with a density of at least one tie member per each $cm^2$ of surface of the internal chamber 3, even more preferably, always by way of example, with a density comprised between 1 and 15 threads per each $cm^2$ of surface of the inflatable member 2, preferably between 4 and 6 threads per each $cm^2$.

Observing the sections 4 and 5, it may be noticed that the tie members 5 are distributed substantially homogeneously in the internal chamber 3.

In the example illustrated by way of example in FIGS. 1 to 10, the inflatable member 2 is wearable and comprises three regions 2a, 2b, 2c, of which:
- a first region 2a, in the figures arranged substantially horizontal and having a slightly arcuate elongated shape, is intended to be placed on a user's shoulders;
- a second region 2b, C-shaped and overlapped parallel to the first region 2a, is intended to be placed around a user's neck, essentially acting as a collar; and
- a third region 2c, having elongated shape and arranged substantially orthogonal to the first region 2a and to the second region 2b, i.e. arranged at a side of the first region 2a that is opposite with respect to the second region 2b, is intended to protect a portion of a user's spine.

Essentially, the first region 2a is interposed between the second region 2b and the third region 2c.

The three regions 2a, 2b, 2c are pneumatically connected thereamong to form the member 2 and a single internal chamber 3. To this end, in a connecting zone 8 connecting with the first region 2a (FIGS. 8 and 9), the second region 2b has an opening 8b set in fluid communication with a corresponding opening 8a obtained in the first region 2a, whereas the third region 2c, in a connecting zone 9 connecting with the first region 2a (FIGS. 8 and 10), has an end mouth 9c which is set in fluid communication with a corresponding opening 9a obtained in the first region 2a at the side opposite with respect to the second region 2b. Suitable bondings (preferably heat-taped) denoted by reference number 4b are carried out in the connecting zone 8 between the two regions 2a and 2b, and further bondings 4c are carried out in the connecting zone 9 between the two portions 2a and 2c, such as to guarantee a seal of the internal chamber 3, so as to prevent inflation gas from leaking from the internal chamber 3 through said connecting zones 8 and 9.

Thanks to the fact that the regions 2a, 2b, 2c are pneumatically connected thereamong, they inflate substantially simultaneously.

In the example, all three regions 2a, 2b, 2c are formed by opposite walls 15, 16 perimetrically sealed along respective perimetral edges or lips 20, 21 and are provided with said tie members 5.

Accordingly, for brevity's sake hereinafter in the description reference will be made to only one of said regions, e.g. the first region 2a, it being understood that the same description applies also to the remaining regions 2b, 2c. However, it is understood that in another possible embodiment of the protection device said tie members 5 may be arranged only in one, or in some of the regions 2a, 2b, 2c.

More precisely, and as shown in FIGS. 4, 5, 6 and 7, the region 2a of the inflatable member 2 comprises at least said two walls 15, 16, or sheets, made of a sheet of soft and gas-tight material, e.g. polyamide or polyurethane, which are opposed the one with respect to the other, and perimetrically fixed along the abovementioned perimetral edges 20, 21 by a sealing edge 17, which will be detailed hereinafter. Tie members 5 are arranged between the walls 15 and 16.

In a further embodiment the walls 15, 16 are made of a laminate which is commonly utilized as clothing lining and includes a fabric layer 15a, in the example 100% nylon (representing about 65% b/w of the laminate) and a glue layer 15b, in the example a glue film (representing about 35% b/w of the laminate), e.g. polyurethane glue, distributed on the fabric layer 15a by roller spreading.

As anticipated above, in the example the tie members 5 are flexible ties and have the shape of threads, and are made e.g. of polyester or polyamide, of a thickness comprised between about 500 and about 1000 decitex (Unit of length of a continuous thread or of a yarn), and have ends 5a, 5b fixed to the respective portions of wall 15, 16 which they connect. Even more particularly, each tie member or thread 5 includes a bundle of continuous torsion-free fibers coming out from a single point of a respective mesh 18, 19.

In fact, the inflatable member 2 comprises meshes 18, 19, each of which lines, i.e. at the internal chamber 3 side, a respective wall 15, 16. Even more particularly, each mesh 18, 19 is stably fixed to the surface of the respective wall 15, 16, by a glue film (not visible in FIGS. 2, 3, 4, 5, 6, and 7 and denoted, e.g., by numbers 130, 131 in FIG. 17) or by seams, or alike fixings.

In case of use of above-mentioned laminate, the glue film is arranged in contact with the glue layer 15b of the laminate.

The tie members 5 have opposite ends 5a, 5b stably fixed to the mesh 18, 19 of the respective wall 15, 16. The fixing at the opposite ends 5a, 5b of the tie members 5 is, e.g., obtained by mere insertion of tie members 5 between the wefts of the mesh 18, 19 as displayed in FIGS. 2, 3, 4, 5, 6, and 7.

In practice, in the example illustrated in the figures, the tie members 5 are obtained by a determined by a determined number of threads which are fixed, in alternate sections, to the one mesh 18, and consecutively to the other mesh 19. In other words, referring to FIG. 3, each thread 5 is threaded below a weft of the mesh 19 of the wall 16, is curved upward and extended again to the opposite wall 15, where it is connected in the same way to the mesh 18.

Alternatively, each tie member 5 is a thread integrally interlaced with, or continuously evolving from, both said first and second mesh 18, 19. In practice, the thread/tie member 5 comes out from one of said first and second mesh 18, 19 and is integrally interlaced with the other one of said first and second mesh 18, 19.

The set of the two meshes 18 and 19 and of the tie members 5 forms a so-called 3D (three-dimensional) or double-knit fabric.

Also the meshes 18 and 19 are made of polyester or polyamide.

The hereto-described protection device is manufactured in the following manner, according to a first embodiment.

In an opposed position and at a preset distance, a pair of meshes 18, 19 are prearranged to which there are fastened, or, as mentioned above, otherwise fixed, ends 5a, 5b of the tie members 5, in which the length of said tie members 5 is selected so as to determine a maximum mutual distance D between the meshes 18, 19 corresponding to a maximum local expansion of the member 2 in an inflated condition.

Then, each mesh 18, 19 is fixed adherent to a respective wall 15, 16, e.g. by glue, i.e., each mesh 18 and 19 lines the respective wall 15, 16.

Then, respective opposed perimetral edges 20, 21 of the walls 15 and 16 are overlapped the one to the other along the perimeter to form, and enclose, the internal chamber 3.

To guarantee a sealed closure of the internal chamber 3, the connection of the perimetral edges 20, 21 of the two walls 15, 16 is obtained by the abovementioned edge 17, which includes a membrane 30 (FIG. 7). In particular, the membrane 30 is preferably triple-layer, comprising an adhesive layer for adhesion to the wall of the inflatable member, at least one intermediate polyurethane film, and an outer layer of mesh (with an antigraze function for protecting the underlying polyurethane film).

Even more particularly, the membrane 30 has the shape of a tape which is folded in a longitudinal direction to form two opposed hems 31, 32. In particular, the membrane 30 houses, between said opposed hems 31 and 32, the pair of perimetral edges 20, 21 of the walls 15, 16.

The hems 31, 32 of the membrane 30 are seamed therebetween by one or more seam lines 34 so as to fix thereinside also the perimetral edges 20, 21 of the walls 15, 16, as illustrated in FIG. 7. A further seam line 33 is provided near the membrane 30 to stably join the overlapped edges 20, 21 of the walls 15, 16, prior to the fixing of the membrane 30. To guarantee air tightness, the seams 33 and 34 are taped (e.g., heat-taped) according to modes substantially within the reach of a person skilled in the art.

It may be observed from the figures that also the two meshes 18, 19 are perimetrically fixed directly therebetween, by the seams 33 and also the seam lines 34 of the membrane 30. In other words, the meshes 18, 19 are not connected therebetween merely by the tie members 5, but also perimetrically fixed therebetween in direct contact. Therefore, they are seams 33 which follow the perimetral profile of the inflatable member 2.

From the above description, it emerges that the two walls 15 and 16 ultimately are two members or sheets of the inflatable member 2, opposed and fixed along the respective perimetral edges 20 and 21. In any case, there is nothing to prevent the two walls 15 and 16 from being opposite portions of a single sheet folded book-like, and therefore having perimetral edges that extend along a portion of the perimeter and closed by sealing tape.

To carry out the inflation of the inflatable member 2, in case of fall and/or sliding and/or unforeseen impact by a user or a vehicle on which he/she travels, the protection device 1 according to the present invention is adapted to cooperate with suitable actuating means operatively connected to inflating means, of which in the figures is illustrated, merely by way of example, a canister 40 of compressed cold gas, connected by a duct 43 or a cannula to an on-off valve 42, fixed to the inflatable member 2, which allows the introduction of an inflating fluid in the inflatable member 2.

The canister 40 may also be included inside the inflatable member 2.

Alternatively, such inflating means may comprise generators of pyrotechnic-type or hybrid-type gas, or of gas of other typologies known to the state of the art.

Said inflating means are controlled by a control unit on the basis of a detection of the state of the vehicle/driver system; e.g., said control unit may implement a fall prediction system allowing a timely identification of a fall event and a reliable prediction thereof by means of accelerometric sensors integral to the vehicle (or to the driver) and an unit for processing the signals produced by the sensors themselves.

As an alternative, the device according to the present disclosure finds application also by utilizing an actuating cable connected to a user-driven vehicle, which cable actuates the inflation of the inflatable member 2 following a separation of the user from the vehicle, e.g., following a fall or an unforeseen impact.

In any case, the abovementioned actuating and inflating means may be integrated in the protection device 1 according to the present invention or located externally thereto.

It also has to be noted that the actuation modes, though being an aspect of particular relevance for an effective operation of the device, will not be further detailed, as being methods fundamentally already known to a person skilled in the art in the protection of an individual from unforeseen impacts.

The protection device 1 further comprises a deflation valve 45, communicating on one side with the internal chamber 3 (e.g., via a small tube 46) and on the other side with the outside environment in order to allow deflation of the inflatable member 2 following actuation, and when a protecting action is not required anymore.

Said deflation valve 45, which normally is in a closed position, is e.g. manually opened, for instance by removing a closure cap, by the user, in particular a pilot (driver) during a competition, when, owing to a fortuitous actuation or following a fall that has entailed the actuation of the device 1, the pilot wishes to resume the competition without being hampered in motions and aerodynamics by the member 2 in an inflated condition. In fact, owing to the pressure difference between the internal chamber 3 of the inflated member 2 and the outside environment, the opening up of the deflation valve 45 causes gas to exit the internal chamber 3 and the inflatable member 2 to deflate. Tie members 5 having elastic features can assist said deflation, by pulling said first wall 15 and second wall 16 toward each other.

As an alternative, the actuation of the deflation valve 45 may be controlled by an electronic control unit (not shown), which opens the deflation valve 45 when a preset time interval (e.g., 12 seconds) has elapsed from actuation of the inflating means.

Referring to FIGS. 11 to 13, hereinafter a personal protection device 101 in accordance to a second embodiment will be described.

Members and parts of the present embodiment having the same function and the same structure of the members and parts of the aforedescribed embodiment keep the same reference number and will not be detailed again.

In particular, the personal protection device 101 comprises an inflatable member 102 including a structure made by the two meshes 18, 19, in practice forming two layers, opposed therebetween and connected by a plurality of tie members 5. The meshes 18, 19 are cut following a pattern along a contour, having a shape profile dependent on the purpose of the inflatable member 102.

The structure including the two meshes 18, 19 and the tie members 5 is included between the two walls 15, 16 to form a sort of sandwich. The walls 15, 16 are adherent to the respective meshes 18, 19, e.g. by glue (not visible in FIGS. 11, 12 and 13), and are perimetrically fixed therebetween, along peripheral edges 20, 21, i.e. at an edge zone 117. In particular, it may be seen from FIGS. 11 and 12 that the meshes 18, 19 have a surface extension smaller than the surface extension of the respective walls 15, 16, so that when the meshes 18, 19 with the tie threads 5 are included between the walls 15, 16, the peripheral edges 20, 21 of the walls 15, 16 are directly sealingly fixed therebetween, e.g. glued, without interposition, in a peripheral or perimetral zone of the meshes 18, 19. Referring to FIGS. 14 to 19, it is now illustrated an embodiment mode of a protection device according to the present disclosure, as an alternative to or in conjunction with the aforedescribed one, which may in particular be used for manufacturing the aforedescribed device 101, or for the protection device 1.

Initially a portion 141 is provided, comprising meshes 18 and 19 to which are fastened, or otherwise fixed as indicated above, ends 5a, 5b of tie members 5. In FIG. 14 the portion 141 is illustrated slightly inflated, so as to understand the presence of the tie members 5, and is indicated with a substantially rectangular profile for simplicity's sake in the explanation. However, it is evident that the portion 141 has shape and size substantially equivalent to a respective inflatable member 2, 102 to be obtained; moreover, the length of the tie members 5 is selected so as to determine a maximum mutual distance D between the meshes 18, 19 corresponding to a maximum local expansion of the respective inflatable member 2, 102 in an inflated condition.

An edge 143 of the mesh 18 is seamed to a respective edge 144 of the mesh 19 facing thereon (seam lines denoted by 147 in FIG. 15). In FIG. 15 the seaming operation is exemplified with a needle 149, however it is evident that the seams 147 may be made by a machine or with other equipment conventional for a person skilled in the art. The seam line 147 substantially follows the perimeter of the portion 141.

Even more particularly, in the example the seam 147 is a linear seam, made with thread, e.g. of polyamide, and including 2 to 3 stitches/cm (i.e., a seam pitch comprised between about 3 and 5 mm).

Prior to completing the seam 147, a duct 43 for connection to the canister 40 is included between the meshes 18, 19. If necessary, similarly to the duct 43, also a small tube 46 (not illustrated in FIG. 15) may be included for connection to the deflation valve 45. Alternatively, as mentioned above, the canister 40 may be included directly between the meshes 18, 19, and the duct 43 may be replaced by the small tube 46.

In FIG. 16 a detail of the seam 147 is illustrated, in which it evidently appears how the seam thread transversally crosses the two meshes 18, 19, tightening them into direct mutual contact.

The portion 141 is enclosed between the sheets 15, 16 of soft and gas-tight material, e.g. of polyurethane or polyamide, or of the above-mentioned so-called laminate, in which the sheets 15, 16 have a surface extension greater than said portion 141.

In the example, the sheets 15 and 16 are glued to the respective meshes 18, 19 by means of a glue film, in the example a polyurethane film having a thickness of about 100 µm, denoted by numbers 130, 131, utilizing a hot press 160 (which, e.g., works at temperatures comprised between about 140° C. and 180° C., preferably at about 150° C.) to foster adhesion and mutual gluing.

In particular, each glue film 130, 131 is included between a mesh 18, 19 of the portion 141 and the respective sheet 15, 16, as illustrated in FIG. 17.

Even more particularly, each glue film 130, 131 is fixed by hot press 160 to the respective sheet 15, 16 in a first step of the method as illustrated in FIG. 18, to form a composite layer 15', 16'.

In the manufacturing of this composite layer 15', 16', if the abovementioned laminate is utilized for the sheets 15, 16, gluing occurs by arranging the glue film 130, 131 at the side of the glue layer 15b of the laminate.

At a later stage, the (perimetrically seamed) portion 141 is included between the two composite layers 15', 16'.

Peripheral edges 120, 121 of the composite layers 15' 16', at which meshes 18, 19 are not enclosed, directly glue the one on the other in a gas-tight manner.

It was found that the use of laminate gives satisfactory results. In particular, the glue film 130, 131 has a high adherence with the laminate (a gluing occurring directly with the glue layer 15b) and, from the other side, it penetrates the meshes 18, 19, so as to fill the pores of meshes 18, 19.

Thus, a high impermeability of the inflatable member 2, 102 is guaranteed, without seal loss due to glue film 130, 131 distribution in pores of the meshes 18, 19.

In addition, the laminate has a high lightness of weight and, concomitantly, gives high strength to the inflatable member 2, 102. Moreover, the fabric layer 15a of laminate is an inextensible fabric which opposes any bubble formation during the machining steps.

The fabric layer 15a, being flexible, moreover adjusts to any mutual displacement occurring between the glue film 130, 131 and the laminate itself during the fixing in the press 160.

As anticipated above, this embodiment may be made in conjunction with the aforedescribed shape; therefore, there is nothing to prevent the inflatable member 2, 102 from including also the edge 30, besides the direct gluing of the peripheral edges 120, 121 of the composite 15' 16'.

It should also be noted that also in this embodiment the two meshes 18, 19 of the portion 141 are perimetrically fixed directly therebetween, by the abovementioned seam 147. In other words, the meshes 18, 19 are not connected therebetween merely by the tie members 5, but also perimetrically fixed in direct contact, in the example by perimetral seam.

The seam 33 of the first embodiment, or the seam 147 of the second embodiment, or an alike perimetral fixing of the meshes 18, 19, entails a significant advantage. In particular, when the inflatable member 2, 102 is subjected to sudden inflation (with inflation times of the order of milliseconds) inside of the inflatable member localized pressure waves occur, even higher than 3 bar.

It has to be pointed out that in FIGS. 4, 7, 11 and 12, at the respective seams 33, 147, in order to simplify the figures, the tie members 5 are illustrated of shorter length and in taut condition. However, it is understood that at the respective seams 33, 147, the tie members 5 are folded and collapsed on themselves.

Thanks to the presence of the seam 33, 147, a pressure distribution or sharing is performed along the entire seam 33, 147, until the pressure inside the inflatable member 2, 102 becomes homogeneous (e.g., the pressure, i.e. the overpressure with respect to the external pressure, is comprised, casewise, between 0.5 bar and 3 bar).

Therefore, the seam 33, 147 serves as a barrier against excessive pressure waves in one or more perimetral zones of the inflatable member 2, 102 where edges 20, 21, 120, 121 of sheets 15, 16 are seamed, and said seam 33, 147 fosters a pressure redistribution, and allows to avoid a possible tearing of the sheets 15, 16 at the edges 20, 21, 120, 121.

Moreover, it is observed that each seam 33, 147 yields a practical advantage from a manufacturing standpoint as well, since during the machining steps the meshes 18, 19 do not move the one with respect to the other.

In a further embodiment, the above-described inflatable member 2, 102 comprises a reinforcing layer 230 (FIG. 25) interposed between a wall 15 and the respective mesh 18.

Said reinforcing layer 230 in the example is comprised of a sheet, or foil, of a material like, e.g., glass fiber or Carbon fiber in a polyurethane matrix, having a thickness of few millimeters (e.g., 2 mm) and a surface extension smaller than the wall 15 and comparable to the region to be protected. Said reinforcing sheet 230 is fixed, e.g. by means of a polyurethane glue not visible in FIG. 25, to the respective wall 15 and to the respective mesh 18 between which it is interposed. Such a reinforcing layer 230 can be inserted at a suitable time during the above-described steps of manufacturing the inflatable members 2, 102.

Referring to FIG. 21, another example of protection device according to the present disclosure is denoted by reference number 100.

For this other embodiment example, members having the same function and structure keep the same reference number of the aforedescribed embodiment, and therefore are not detailed again.

The protection device 100 has a bib-like shape and comprises a pair of inflatable members 200, 201 intended to be placed respectively at a user's chest and back, wherein said inflatable members 200, 201 are connected by straps 203, 204 at a user's collarbones.

In particular, said inflatable members 200, 201 and said straps 203, 204 are part of a single inflatable member and therefore are pneumatically communicating therebetween.

As in the aforedescribed embodiments, in each inflatable member 200, 201 an internal chamber is defined, and a plurality of tie members 5 are distributed in the internal chamber, and stably connected to respective internal superficial portions of each inflatable member 200, 201, as schematically indicated in the sectional parts of FIG. 21.

Moreover, as in the preceding embodiments, each inflatable member 200, 201 is formed by opposite walls 15, 16 perimetrically closed by an edge 17 made in the same way mentioned above, or are made according to the machining steps of FIGS. 11 to 19.

In this case as well, the tie members 5 have the function of keeping joined or stationary, by tensile stress of the tie members 5, two or more parts of the opposite walls 15, 16 of the inflatable member 200, 201, at least when the latter is in an inflated condition.

The protection device 100 further comprises a plurality of tape-shaped, triple-layer membranes 30*a*, which are seamed outside of the walls 15, 16 of the inflatable member 200, i.e. of the member intended to protect the user's chest, to further limit the expansion of the inflatable member 200 near the user's neck and collarbones with respect to the remaining portions of the inflatable member 200.

Referring to FIGS. 23, 23A and 24, a manufacturing mode of a protection device according to the present disclosure will presently be illustrated, as an alternative or in combination with the aforedescribed ones, which can also be used to manufacture the aforedescribed devices 1, 100, 101.

Initially, portions 240, 241 are provided, each comprising meshes 18 and 19 to which ends of tie members 5 are fastened, or otherwise fixed. Each portion 240, 241 has shape and sizes substantially equivalent to a respective inflatable member 251 to be obtained; moreover, the length of the tie members 5 is selected so as to determine a maximum mutual distance between the meshes 18, 19 corresponding to a maximum local expansion of the respective inflatable member 251 in an inflated condition.

An edge 243 of the mesh 18 of the first portion 240 is seamed to a respective edge 244 of the mesh 18 of the second portion 241, and likewise the edges 243 and 244 of the respective opposite meshes 19 are seamed (the seam line is denoted by 246 in FIG. 23A). Thus, the portions 240 and 241 are joined therebetween, in fact obtaining a single portion 242 equipped with ties 5 and having an extension equal to the sum of the portions 240 and 241. It has to be noted that the ties 5 of the first portion 240 might have different lengths with respect to the ties 5 of the second portion 241.

It is noted that in FIGS. 23 and 23A, although the connection provided by the perimeter seam line 246, the meshes 18 and 19 are represented spaced apart from each other in order to show the presence of the tie members 5.

Along the peripheral edges 245 of the single portion 242 thus obtained, the mesh 18 is seamed to the respective mesh 19 (the perimetral seam lines are denoted by 247 and are made like the above-described seams 147). In FIG. 23, the seaming operation is exemplified with needles 249, however it is evident that the seams 246, 247 may be machine-made.

Said single portion 242 is enclosed between sheets 215, 216 of soft and gas-tight material, e.g. of polyurethane or polyamide, or of laminate, having a surface extension greater than said single portion 242. In the example, the sheets 215 and 216 are glued to the respective meshes 18, 19 by means of a polyurethane glue (e.g., the abovementioned polyurethane films 130, 131), utilizing a hot press 160 (which, e.g., works at temperatures of about 150° C.) to foster adhesion and mutual gluing. Peripheral edges 220, 221 of the sheets 215 and 216, projecting with respect to the meshes 18, 19, i.e., at which the meshes 18, 19 are not enclosed, are glued the one to the other in a sealed and gas-tight manner. Therefore, an inflatable member 251 is obtained, which comprises both portions 240, 241 and has the sheets 215 and 216 as walls.

Optionally, referring to FIGS. 26 to 29, in the gluing step a reinforcing layer 230 may be arranged between a mesh 18 of a single portion 240 and the respective sheet 215; also said reinforcing layer 230 may be glued by means of polyurethane glue.

Preferably, the sheets 215 and 216 exhibit a certain degree of elasticity, so as to be able to deform during an inflation of the inflatable member 251 and allow a differentiated expansion of the first portion 240 and the second portion 241, e.g. in case those have tie members 5 of lengths different thereamong, as shown by way of example in FIG. 29.

Referring to FIGS. 20 and 22, a portion of garment 50, 60 according to the present disclosure is illustrated, which garment 50, 60 includes a protection device 1, 100 or 101, i.e. those illustrated in FIGS. 1 to 10, in FIGS. 11 to 19, in FIG. 21, in FIGS. 23 to 24, in FIG. 25, or in FIGS. 26 to 29.

In particular, the garment 50 of FIG. 20 is a motorcyclist suit, having a pocket 53 or case arranged at the shoulders and neck, in which the protection device 1, 100, 101 is inserted.

The garment 50 has the specific advantage of guaranteeing an optimal aerodynamic property of the suit under conditions of a driver's driving when the inflatable member 2 is deflated, thanks to the fact that the pocket 53 is collapsed with minimum encumbrance, and does not entail surface discontinuities on the garment 50. At the same time, when required, the pocket 53 is capable to contain the inflatable member 2 in an inflated condition, both preventing that the inflatable member may be damaged during the impact and guaranteeing anyhow a certain aerodynamic property.

Evidently, the fact of providing a pocket 53 apt to contain and cover the inflatable member 2 even when the latter is in an inflated condition is fostered by the fact that the inflatable member 2, thanks to the presence of the tie members 5, assumes a preset three-dimensional shape, and above all with a limited thickness.

Moreover, the deflation of the inflatable member 2 is allowed thanks to the opening up of the deflation valve 45. Therefore, following deflation of the inflatable member 2 the exterior aspect and the aerodynamic features of the garment 50 are substantially identical to those prior to the actuation of the inflating means, enabling the driver to easily continue the competition (though with a protection device 1 ineffective in case of a subsequent fall).

Referring to FIG. 22, a garment is illustrated, in the example a motorcyclist suit 60, including a protection device 300 having the same features of the aforedescribed ones 1, 100, 101, i.e. including an inflatable member 2, in which the internal chamber and a plurality of tie members distributed in the internal chamber are defined. In the example, the inflatable member 2 is arranged only in the collar of the motorcyclist suit 60.

In particular, the motorcyclist suit 60 includes a collar comprising two openable hems 62.

The two hems 62, during a normal use of the suit 60, are kept closed via suitable closure means, e.g. by means of seams with threads having a calibrated ultimate tensile strength, or other reversible closure system.

When the inflatable member 2 is being inflated, seams break and the two hems 62 open up, letting out the member 2.

The subject of the present disclosure has been hereto described with reference to preferred embodiments thereof. It is understood that other embodiments might exist, all falling within the concept of the same invention, and all comprised within the protective scope of the claims hereinafter.

The invention claimed is:

1. A personal protection device, comprising:
    an inflatable member;
    an internal chamber inside the inflatable member; and
    a plurality of tie members distributed in the internal chamber, the tie members stably connected to respective superficial portions of said inflatable member,
    wherein said inflatable member is adapted to assume an active inflated condition or a resting deflated condition,
    wherein said inflatable member further comprises:
    a first wall and a second wall, the first wall and the second wall fixed to one another along their respective peripheral edges;
    a first mesh aligned at least partially with said first wall;
    a second mesh aligned at least partially with said second wall, said plurality of tie members having opposite ends fixed respectively to said first mesh and said second mesh;
    a first glue film interposed between the first mesh and the first wall; and
    a second glue film interposed between the second mesh and the second wall,
    wherein each of said first wall and second wall is a laminate comprising a first layer and a second layer, said first layer being a fabric layer and said second layer being a glue layer,
    said first glue film, on one side, adheres to the second layer of the first wall and, on the other side, penetrates into pores of the first mesh, and
    said second glue film, on one side, adheres to the second layer of the second wall and, on the other side, penetrates into pores of the second mesh.

2. The personal protection device according to claim 1, wherein said personal protection device is adapted to assume said active inflated condition upon unexpected impact.

3. The personal protection device according to claim 1, wherein said tie members are thread shaped.

4. The personal protection device according to claim 1, wherein said tie members are flexible and sized such that, when said inflatable member is in the resting deflated condition, said tie members are in a non-tensioned condition and collapsed in said internal chamber, and when said inflatable member is in the active inflated condition, said tie members are subjected to tensile stress.

5. The personal protection device according to claim 1, wherein a surface extension between said first wall and said second wall is greater than the surface extension of a respective first mesh and said second mesh, wherein peripheral edges of said first wall and said second wall projecting respectively from said first mesh and said second mesh are sealingly joined therebetween.

6. The personal protection device according to claim 1, wherein said first mesh is peripherally fixed in direct contact with said second mesh.

7. The personal protection device according to claim 1, further comprising a peripheral seam adapted to directly connect said first mesh to said second mesh.

8. The personal protection device according to claim 1, wherein said tie members are threads, wherein each tie member has a first end and a second end, the first end continuously interlaced with said first mesh, and the second end continuously interlaced with said second mesh.

9. The personal protection device according to claim 1, further comprising actuating means for actuating said inflatable member.

10. The personal protection device according to claim 1, further comprising a deflation valve communicating with said internal chamber, said deflation valve adapted to deflate said inflatable member from said active inflated condition to said resting deflated condition.

11. The personal protection device according to claim 1, wherein said inflatable member assumes said active inflated condition when a pressure in the internal chamber is between 0.5 and 3 bars.

12. A garment comprising the personal protection device according to claim 1.

13. The protection device according to claim 1, wherein said fabric layer comprises nylon.

* * * * *